US011854093B2

(12) United States Patent
Katzman

(10) Patent No.: US 11,854,093 B2
(45) Date of Patent: Dec. 26, 2023

(54) GRAPHICAL USER INTERFACE AND METHOD OF GENERATION FOR CONTACTING GOVERNMENT REPRESENTATIVES

(71) Applicant: Contact My Politician, LLC, Franklin, MI (US)

(72) Inventor: Steve Katzman, Farmington Hills, MI (US)

(73) Assignee: Contact My Politician, LLC, Franklin, MI (US)

( * ) Notice: Subject to any disclaimer, the term of this patent is extended or adjusted under 35 U.S.C. 154(b) by 0 days.

(21) Appl. No.: 17/885,013

(22) Filed: Aug. 10, 2022

(65) Prior Publication Data
US 2023/0088983 A1    Mar. 23, 2023

Related U.S. Application Data

(63) Continuation of application No. 16/942,316, filed on Jul. 29, 2020, now Pat. No. 11,449,956.
(Continued)

(51) Int. Cl.
*G06Q 50/00*     (2012.01)
*G06F 3/0482*    (2013.01)
(Continued)

(52) U.S. Cl.
CPC ........... *G06Q 50/01* (2013.01); *G06F 3/0482* (2013.01); *G06F 9/547* (2013.01); *G06F 16/29* (2019.01);
(Continued)

(58) Field of Classification Search
CPC ........ G06F 3/0482; G06F 9/547; G06F 16/29; G06F 16/904; G06F 16/9558;
(Continued)

(56) References Cited

U.S. PATENT DOCUMENTS

| 2009/0173777 A1 | 7/2009 | Ward |
| 2012/0042072 A1 | 2/2012 | Glanton |

(Continued)

FOREIGN PATENT DOCUMENTS

WO    WO-2016179235 A1 * 11/2016 ............ G06Q 10/10

OTHER PUBLICATIONS

Openstates.org, as archived Mar. 31, 2018, available at: https://web.archive.org/web/20180331191639/https://openstates.org/ (Year: 2018).*
(Continued)

*Primary Examiner* — Brendan S O'Shea
(74) *Attorney, Agent, or Firm* — Foley & Lardner LLP

(57) ABSTRACT

A method comprises generating a graphical user interface including a list of government representatives associated with a geographical indicator of a user, the list of government representatives allowing the user to select multiple government representatives for messaging simultaneously, and a plurality of links, each link of the plurality of links being associated with a corresponding government representative and configured to direct the user to a corresponding profile page of the corresponding government representative when selected. The method further comprises displaying the graphical user interface on a display of a user device associated with the user. The method further comprises receiving a selection of a link of the plurality of links from the user via the graphical user interface. The method further comprises displaying, based on the selection of the link, the corresponding profile page associated with the corresponding government representative.

34 Claims, 29 Drawing Sheets

Related U.S. Application Data

(60) Provisional application No. 62/880,346, filed on Jul. 30, 2019.

(51) Int. Cl.
| | |
|---|---|
| *G06F 16/904* | (2019.01) |
| *G06F 16/9035* | (2019.01) |
| *G06Q 50/26* | (2012.01) |
| *G06Q 10/105* | (2023.01) |
| *G06F 9/54* | (2006.01) |
| *G06F 16/29* | (2019.01) |
| *H04L 51/52* | (2022.01) |
| *H04L 67/52* | (2022.01) |
| *G06F 16/955* | (2019.01) |

(52) U.S. Cl.
CPC ........ *G06F 16/904* (2019.01); *G06F 16/9035* (2019.01); *G06F 16/9558* (2019.01); *G06Q 10/105* (2013.01); *G06Q 50/26* (2013.01); *H04L 51/52* (2022.05); *H04L 67/52* (2022.05)

(58) Field of Classification Search
CPC .. G06F 16/9035; G06Q 10/105; G06Q 50/01; G06Q 50/26; H04L 67/52; Y10S 706/933
See application file for complete search history.

(56) References Cited

U.S. PATENT DOCUMENTS

| | | | |
|---|---|---|---|
| 2012/0323888 A1* | 12/2012 | Osann, Jr. | G06F 16/248 707/E17.014 |
| 2013/0103436 A1 | 4/2013 | Torkelson | |
| 2014/0324442 A1 | 10/2014 | Barnes, III | |
| 2015/0006286 A1 | 1/2015 | Liu et al. | |
| 2015/0213135 A1 | 7/2015 | Zhang | |
| 2019/0066230 A1 | 2/2019 | Dange | |
| 2019/0385221 A1 | 12/2019 | Cen et al. | |

OTHER PUBLICATIONS

Strunk, Delaney "Having trouble reaching your Congressperson? There's an app for that" CNN Mar. 28, 2017; available at: https://www.cnn.com/2017/03/28/politics/representative-calling-app-trnd/index.html (Year: 2017).*

CNN, Having trouble reaching your Congressperson? There's an app for that, printed on Nov. 17, 2020 from Internet address: https://www.cnn.com/2017/03/28/politics/representative-calling-app-tmd/index.html, 3 pages.

Jacobsen, Payton "5 Calls App Makes Congressional Communication Easy" The Borgen Project, May 15, 2017; available at https://borgenproject.org/5-calls-app-makes-congressional-communication-easy/ (Year: 2017).

Locklear, Mally "US Representative calls for civics-focused social networks" Engadger, Dec. 29, 2017; available at https://www.engadget.com/2017-12-29-US-representative-civics-focused-social-networks.html (Year:2017).

Resistbot, Contact Your Representatives in 2 Minutes, printed on Nov. 17, 2020 from Internet address: https://resist.bot, 11 pages.

Seitz, Dan, The Five Best Apps For Keeping An Eye On Congress article dated Feb. 26, 2018, printed on Nov. 17, 2020 from Internet address: https://uproxx.com/technology/best-apps-for-keeping-an-eye-on-congress/, 8 pages.

Warren, Rosemary, Pocket Democracy—The Verge article dated Feb. 14, 2017, printed on Nov. 17, 2020 from Internet address: https://www.theverge.com/2017/2/14/14603226/political-apps-congress-votespotter-we-the-epople-voter-countable, 18 pages.

Whatsls.com"pop-up" Internet Technologies Glossary, Apr. 2005, as archived Jun. 1, 2012; available at:https://web.archive.org/web/20120601043338/https://whatis.techtarget.com/definition/pop-up (Year: 2012).

Wired, Apps Make Pestering Congress So Easy That Politicians Can't Keep Up, printed on Nov. 17, 2020 from Internet address: https://www.wired.com/2017/01/apps-make-pestering-congress-easy-cant-keep/, 5 pages.

* cited by examiner

FIG. 9C

DASHBOARD   INBOX   WATCHING   MY PROFILE

WRITE A NEW MESSAGE — RECORD A VIDEO MESSAGE

ENTER YOUR ZIP CODE OR A POLITICIAN'S NAME TO BEGIN

SUBJECT

CHOOSE OR UPLOAD A VIDEO

VIDEO URL

MAX. VIDEO SIZE LIMIT OF 100MB/MAX VIDEO LENGTH OF 3 MINUTES.
TAG YOUR MESSAGE:
SELECT OPTION

USE CAMERA OR CHOOSE A FILE

MAKE THIS MESSAGE:
○ PUBLIC  ○ PRIVATE

WOULD YOU LIKE A RESPONSE FROM THE RECIPIENT?
○ YES  ○ NO

SEND    SAVE AS DRAFT

HOW IT WORKS   WHY CONTACT MY POLITICIAN   FAQ   CONTACT US   ABOUT US
SITEMAP   TERMS AND CONDITIONS   PRIVACY POLICY

© 2019 CONTACT MY POLITICIAN
CONTACT MY POLITICIAN, THE CONTACT MY POLITICIAN LOGO AND ALL CONTACT MY POLITICIAN RELATED MARKS ARE TRADEMARKS OF CONTACT MY POLITICIAN.

GRAPHICAL USER INTERFACE AND METHOD OF GENERATION FOR CONTACTING GOVERNMENT REPRESENTATIVES

BACKGROUND

Communication between residents and their government representatives has traditionally been a tedious process. Specifically, a resident who wishes to contact their government representatives has generally had to first sort through numerous information sources to determine who represents them. Then, once the resident has determined who represents them, the resident has then had to refer to additional references to obtain individual contact information regarding those government representatives. Finally, once the resident has obtained the contact information for the various government representatives, the resident has had to contact each government representative individually, through mail, e-mail, phone calls, or other communication methods that do not group messages by topic, and with low likelihood that the government representative will read the message or provide a response.

SUMMARY

According to one aspect of the disclosure, a method is disclosed. The method comprises generating a graphical user interface. The graphical user interface includes a list of government representatives associated with a geographical indicator of a user, the list of government representatives allowing the user to select multiple government representatives for messaging simultaneously and organized among at least two columns each including at least one government representative of the list of government representatives. The graphical user interface further includes a plurality of links, each link of the plurality of links being associated with a corresponding government representative and configured to direct the user to a corresponding profile page of the corresponding government representative. The method further comprises displaying the graphical user interface on a display of a user device associated with the user. The method further comprises receiving a selection of a link of the plurality of links from the user via the graphical user interface. The method further comprises displaying, based on the selection of the link, the corresponding profile page associated with the corresponding government representative.

According to another aspect of the disclosure, a system is disclosed. The system comprises a processing circuit including a processor coupled to a non-transitory machine readable storage media having instructions stored therein that, when executed by the processor, cause the processor to perform operations. The operations comprises generating a graphical user interface. The graphical user interface includes a list of government representatives associated with a geographical indicator of a user, the list of government representatives allowing the user to select multiple government representatives for messaging simultaneously and organized among at least two columns each including at least one government representative of the list of government representatives. The graphical user interface further includes a plurality of links, each link of the plurality of links being associated with a corresponding government representative and configured to direct the user to a corresponding profile page of the corresponding government representative. The operations further comprise displaying the graphical user interface on a display of a user device associated with the user. The operations further comprise receiving a selection of a link of the plurality of links from the user via the graphical user interface. The operations further comprise displaying, based on the selection of the link, the corresponding profile page associated with the corresponding government representative.

According to another aspect of the disclosure, a system is disclosed. The system comprises a processing circuit including a processor coupled to a non-transitory machine readable storage media having instructions stored therein that, when executed by the processor, cause the processor to perform operations. The operations comprise generating a graphical user interface to be displayed to a user. The graphical user interface includes a list of government representatives associated with a geographical indicator of the user, the list of government representatives organized among at least two columns each including at least one government representative of the list of government representatives. The graphical user interface further includes a plurality of selection boxes, each selection box of the plurality of selection boxes encompassing an area adjacent to a corresponding government representative, the plurality of selection boxes allowing for multiple government representatives to be selected via the graphical user interface simultaneously. The graphical user interface further includes a send message button configured to send a message from the user to one or more government representatives of the list of government representatives selected using one or more selection boxes of the plurality of selection boxes. The operations further comprise receiving a selection of a plurality of government representatives from the user via a corresponding plurality of selection boxes of the graphical user interface. The operations further comprise sending a message from the user to the plurality of government representatives simultaneously.

According to another aspect of the disclosure, a method is disclosed. The method comprises generating a graphical user interface to be displayed to a user. The graphical user interface includes a list of government representatives associated with a geographical indicator of the user, the list of government representatives organized among at least two columns each including at least one government representative of the list of government representatives. The graphical user interface further includes a plurality of selection boxes, each selection box of the plurality of selection boxes encompassing an area adjacent to a corresponding government representative, the plurality of selection boxes allowing for multiple government representatives to be selected via the graphical user interface simultaneously. The graphical user interface further includes a send message button configured to send a message from the user to one or more government representatives of the list of government representatives selected using one or more selection boxes of the plurality of selection boxes. The method further comprises receiving a selection of a plurality of government representatives from the user via a corresponding plurality of selection boxes of the graphical user interface. The method further comprises sending a message from the user to the plurality of government representatives simultaneously.

BRIEF DESCRIPTION OF THE DRAWINGS

The foregoing and other features of the various embodiments of the methods and apparatuses described herein will become more apparent from the following detailed description and the accompanying drawings in which:

FIGS. 9A-9C are examples of various message generation screens provided by the system of FIG. 1 according to an exemplary embodiment;

DETAILED DESCRIPTION

Referring generally to the figures, systems and methods for enabling users or residents (e.g., citizens and/or non-citizens) to conveniently find and contact their government representatives via a multi-recipient selection and communication (MRSC) application according to one or more example embodiments are shown and described. Communication between residents and their government representatives has traditionally been a tedious process. Specifically, a resident who wishes to contact their government representatives has generally had to first sort through numerous information sources to determine who represents them. Then, once the resident has determined who represents them, the resident has then had to refer to additional references to obtain individual contact information regarding those government representatives. Finally, once the resident has obtained the contact information for the various government representatives, the resident has had to contact each government representative individually, through mail, e-mail, phone calls, or other communication methods that do not group messages by topic, and with low likelihood that the government representative will read the message or provide a response. Further, due to periodic district zoning changes and potentially unverified or non-updated information sources, misidentification of the government representatives and/or their contact information has typically further reduced the likelihood that the correct government representatives will receive, read, and respond to the resident's message.

The embodiments of the systems and methods for enabling users or residents to conveniently find and contact their government representatives via the MRSC application described herein improve current computing systems by performing certain steps that cannot be done by conventional computing systems or human actors. For example, the MRSC application allows for the accurate determination of a resident's government representatives based on a geographic indicator regarding the resident. The MRSC application further provides a platform for enabling the resident to efficiently communicate with multiple government representatives and group conversations with the multiple government representatives by topic, thereby improving current methods for contacting government representatives. Furthermore, the MRSC application enables users to more easily participate in political speech and actively advance their interests at all levels of government, unlike any known communication system.

Figure 1:
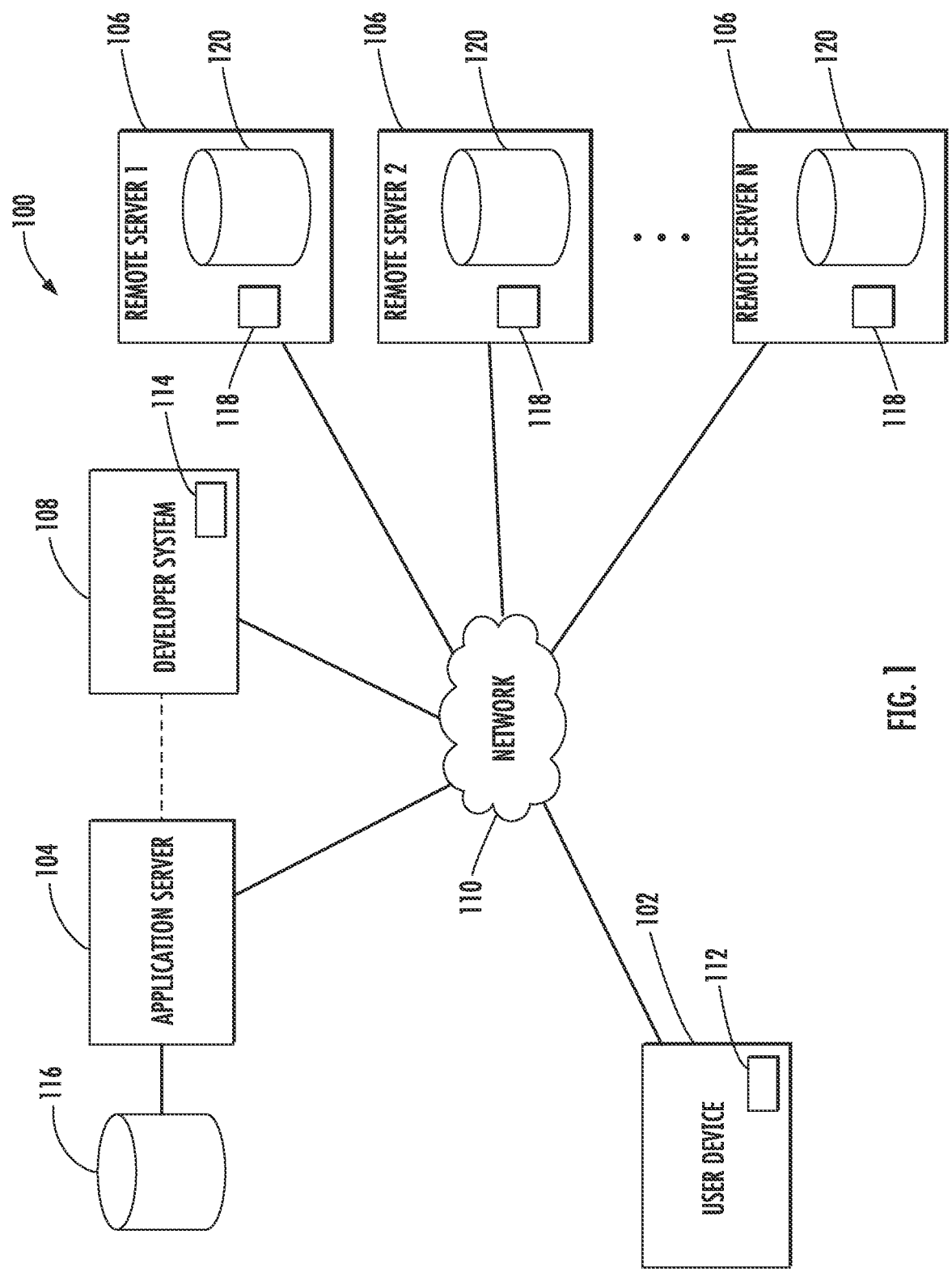
FIG. 1 is a block diagram of a multi-recipient selection and communication system according to an exemplary embodiment.

FIG. 1 is a block diagram of a multi-recipient selection and communication system 100 for providing a platform for users or residents to easily identify, select, and communicate with their elected and/or non-elected government representatives. The system 100 further allows users or residents to find pertinent information about their elected government representatives, including real-time news regarding their government representatives. The system 100 further provides an open public platform for communications between residents and their respective government representatives to be openly viewable by other residents who have similar concerns.

The system 100 includes a user device 102, an application server 104, a plurality of remote servers 106, and a developer system 108. The various components of the system 100 are in communication with each other and connected by a network 110. The user device 102 may be any suitable user computing device. For example, the user device 102 may be a mobile phone, a personal computer (e.g., a desktop computer or a laptop computer), a tablet, a smart watch or other wearable device, or any other suitable user computing device capable of accessing and communicating using local and/or global networks. In some embodiments, the user device 102 includes a web browser 112.

In some embodiments, the application server 104 is a web server and act as a host server for a multi-recipient selection and communication (MRSC) application 114 created and maintained by the developer system 108. The application server 104 includes and/or is in direct communication with an application server database 116. The application server 104 is further configured to communicate with one or more of the remote servers 106 through corresponding application programming interfaces (APIs) 118 that are configured to provide access to various forms of information stored within corresponding remote server databases 120. Accordingly, the application server 104 includes a web server application or engine that is configured to present various API and developer related information via a web-based interface or series of user interface pages.

The remote servers 106 are selectively accessible by the user device 102, the application server 104, and/or the developer system 108 using the various APIs 118. The remote servers 106 each comprise a corresponding remote server database 120 containing specific information pertaining to various topics, as will be discussed below.

The developer system 108 is any suitable developer computing system configured to enable the development of a networked-based, e.g., Internet-based, application configured to run on the application server 104, the user device 102, or a combination of the application server 104 and user device 102. Although depicted in FIG. 1 as a separate components, in some instances, the developer system 108 and the application server 104 may be incorporated into a single server system configured to both enable the development of network-based applications (e.g., the MRSC application 114) and act as a host server for those network-based applications. In any case, the application server 104 comprises a web server running a Web 2.0 application or the like. The user device 102 includes a web browser 112 that supports Web 2.0 operations (e.g., personal media device, cellular telephone, personal computer, and the like).

Web applications running on the application server 104 use server-side dynamic content generation mechanisms such as, without limitation, Java servlets, CGI, PHP, or ASP. In certain embodiments, mashed content is generated by the web browser 112 via, for example, client-side scripting including, without limitation, JavaScript and/or applets. In one embodiment, the client-side operations of the web browser 112 include code embedded in the user interface pages of the application server 104 along with scripting API libraries or applets that are made available by the content provider via the application server 104. In certain embodiments, the application server 104 and the web browser 112 operate in combination to provide a user with a mashup-based service, referred to as a rich Internet application (RIA).

In certain embodiments, the application server 104 and user device 102 include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services utilize web protocols including, without limitation, the services-orientated access protocol (SOAP) and representational state transfer (REST). REST may utilize HTTP with XML.

In one embodiment, the developer system 108 enables the development of the MRSC application 114. The MRSC application 114 is a network-based, e.g., an internet-based, application that is configured to provide multi-recipient selection and communication between a resident (e.g., a citizen or a non-citizen) and various government officials that represent the user according to an exemplary embodiment. The MRSC application 114 is configured to run on the application server 104, the user device 102, or a combination of the application server 104 and user device 102.

In some instances, requests for information are relayed from the MRSC application 114 to the application server 104, which accesses and returns the information from the application server database 116 to the MRSC application 114. In some instances, the requests are relayed from the MRSC application 114 to the application server 104, which are then relayed to one or more of the remote servers 106 using the corresponding APIs 118. The APIs 118 are configured to access and return information from the remote server databases 120 to the application server 104, which then returns the information to the MRSC application 114. As indicated by the ellipsis in FIG. 1, the application server 104 is configured to communicate with any number of remote servers 106 to obtain various data deemed necessary or desirable for use with the MRSC application 114, as described herein.

Figure 2:
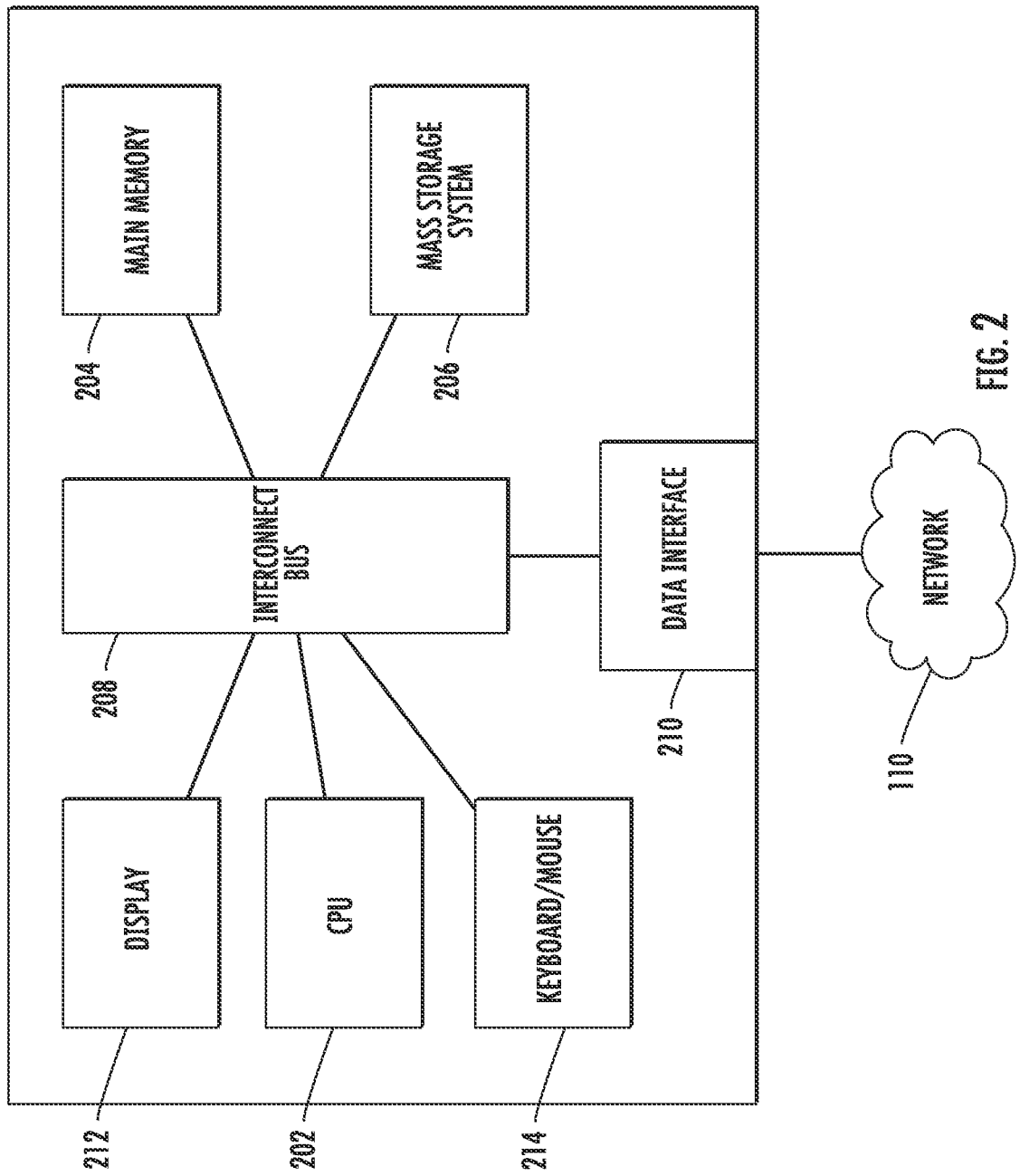
FIG. 2 is a functional block diagram of a computer for performing a multi-recipient selection and communication application according to an exemplary embodiment.

FIG. 2 is a functional block diagram of a computer system 200 for performing the functions of the user device 102, the application server 104, and/or the developer system 108 according to an exemplary embodiment. That is, each of the user device 102, the application server 104, and/or the developer system 108 will be understood to include the same or similar features to those described below, with reference to the computer system 200. The exemplary computer system 200 includes a central processing unit (CPU) 202, a main memory 204, a mass storage system 206, and an interconnect bus 208. The CPU 202 includes a single processor or microprocessor or a plurality of processors or microprocessors for configuring computer system 200 as a multi-processor system. The main memory 204 includes a read only memory. The main memory 204 also includes random access memory (RAM), dynamic random access memory (DRAM), and high-speed cache memory. In operation and use, the main memory 204 stores at least portions of instructions and data for execution by the CPU 202.

The mass storage system 206 includes one or more magnetic disk or tape drives or optical disk drives, for storing data and instructions for use by the CPU 202. At least one component of the mass storage system 206 (e.g., in the form of a disk drive or tape drive) stores a database for use with the MRSC application 114. The mass storage system 206 also includes one or more drives for various portable media, such as a floppy disk, a compact disc read only memory (CD-ROM), flash memory, or an integrated circuit non-volatile memory adapter (e.g., PC-MCIA adapter) to input and output data and code to and from the computer system 200. In one embodiment, the mass storage system 206 includes a plurality of storage devices or media that are interconnected via a communications network. The plurality of storage media are configured to interact such that the storage media function as a virtual mass storage system 206. In some instances, one or more of the plurality of storage media reside in separate locations while being interconnected electronically.

The computer system 200 also includes one or more input/output interfaces, shown by way of example as data interface 210, for data communications via a network, such as the network 110 of the system 100. The data interface 210 is a modem, an Ethernet card or any other suitable data communications device. To provide the functions of the user device 102 and/or the developer system 108 according to FIG. 1, the data interface 210 provides a relatively high-speed link to the network 110, which is a local area network (LAN), an intranet, the Internet, or any other suitable communications network, either directly or through an another external interface. The communication link to the network 110 is, for example, optical, wired, or wireless (e.g., via satellite, 802.11 Wi-Fi, or cellular network). Alternatively, the computer system 200 includes a mainframe or other type of host computer system capable of Web-based communications via the network 110.

The computer system 200 also includes suitable input/output ports and/or uses the interconnect bus 208 for interconnection with a local display 212 (e.g., a touchscreen display) and keyboard/mouse devices 214, or the like, serving as a local user interface for programming and/or data entry, retrieval, or manipulation purposes. In some embodiments, server operations personnel may interact with the system 200 for controlling and/or programming the computer system 200 from remote terminal devices via the network 110.

The computer system 200 is configured to run a variety of application programs and store associated data in a database of the mass storage system 206. One such application is the MRSC application 114. Accordingly, the computer system 200 is configured to run the MRSC application 114 to provide multi-recipient selection and communication between a resident (e.g., a citizen or a non-citizen) and various government officials that represent the user. As referred to above, the MRSC application 114 is a network-based or web application. Accordingly, the system 200 includes software and/or hardware capable of implementing a web application. The MRSC application 114 includes software such as HTML, XML, WML, SGML, PHP (Hypertext Preprocessor), CGI, and like languages.

The components contained in the computer system 200 are those typically found in general purpose computer systems used as servers, workstations, personal computers, network terminals, portable devices, and the like. These components are intended to represent a broad category of such computer components that are well known in the art. Certain aspects of the present disclosure relate to the software elements, such as the executable code for the user interface functionality of the MRSC application 114.

The foregoing embodiments may be realized as a software component operating in the system 200 where the system 200 is Unix workstation or other type of workstation. Other operation systems may be employed such as, without limitation, Windows and LINUX. In such embodiments, the software of the user device 102, the application server 104, and/or the developer system 108 can optionally be implemented as a C language computer program, or a computer program written in any high level language including, without limitation, C++, Fortran, Java, or Visual BASIC. Certain script-based programs may be employed such as XML, WML, PHP, and so on.

As stated previously, the mass storage system 206 includes a database. The database is any suitable database system, including the commercially available Microsoft Access database, and can be a local or distributed database system. The database is supported by any suitable persistent data memory, such as a hard disk drive, RAID system, tape drive system, flash memory, floppy diskette, or any other suitable system. The system 200 includes a database that is integrated with the system 200, however, it will be understood by those of ordinary skill in the art that in other embodiments the database and mass storage system 206 can be an external element.

In certain embodiments, the system 100 and/or the system 200 enables access to various APIs, web services, web-based APIs, and data feeds. The APIs can be either openly accessible or include access control capabilities. The MRSC application 114 is configured to produce various user interface pages using data pulled from the remote servers 106 using the various APIs 118. Accordingly, the MRSC application 114 running on the user device 102, the application server 104, and/or the developer system 108 is configured to provide real-time access to elements (e.g., data, routines, functions, code, procedures, etc.) of selected APIs 118 to the web-based MRSC application 114, which operates as a run-time application or a web-based application that is formed, made, linked, and/or compiled at run-time.

Referring now to FIGS. 3A-16, various examples of user interface pages provided by the MRSC application 114 for displaying on a user interface, such as the web browser 112 of the user device 102 or the display 212 of the computer system 200, are shown according to exemplary embodiments. As illustrated, the MRSC application 114 is configured to produce a series of pages or screens relating to contacting a government representative, referred to herein as "Application Screens." As such, the term "Application Screens" is used interchangeably with the MRSC application 114 in the following description, and it will be understood that either the "Application Screens" or the MRSC application 114 is meant to refer to the MRSC application 114, including the functionality of the MRSC application 114 and/or the corresponding user interface pages created by the MRSC application 114. It will further be appreciated that the "Application Screens" or the MRSC application 114 may be implemented as a website-based application, a mobile or smart phone application, a tablet application, a smart watch or other wearable device application, and/or any other suitable application configured for use with a graphical user interface similar in look and function to the "Application Screens" or the MRSC application 114 described and shown herein.

Figure 3A:
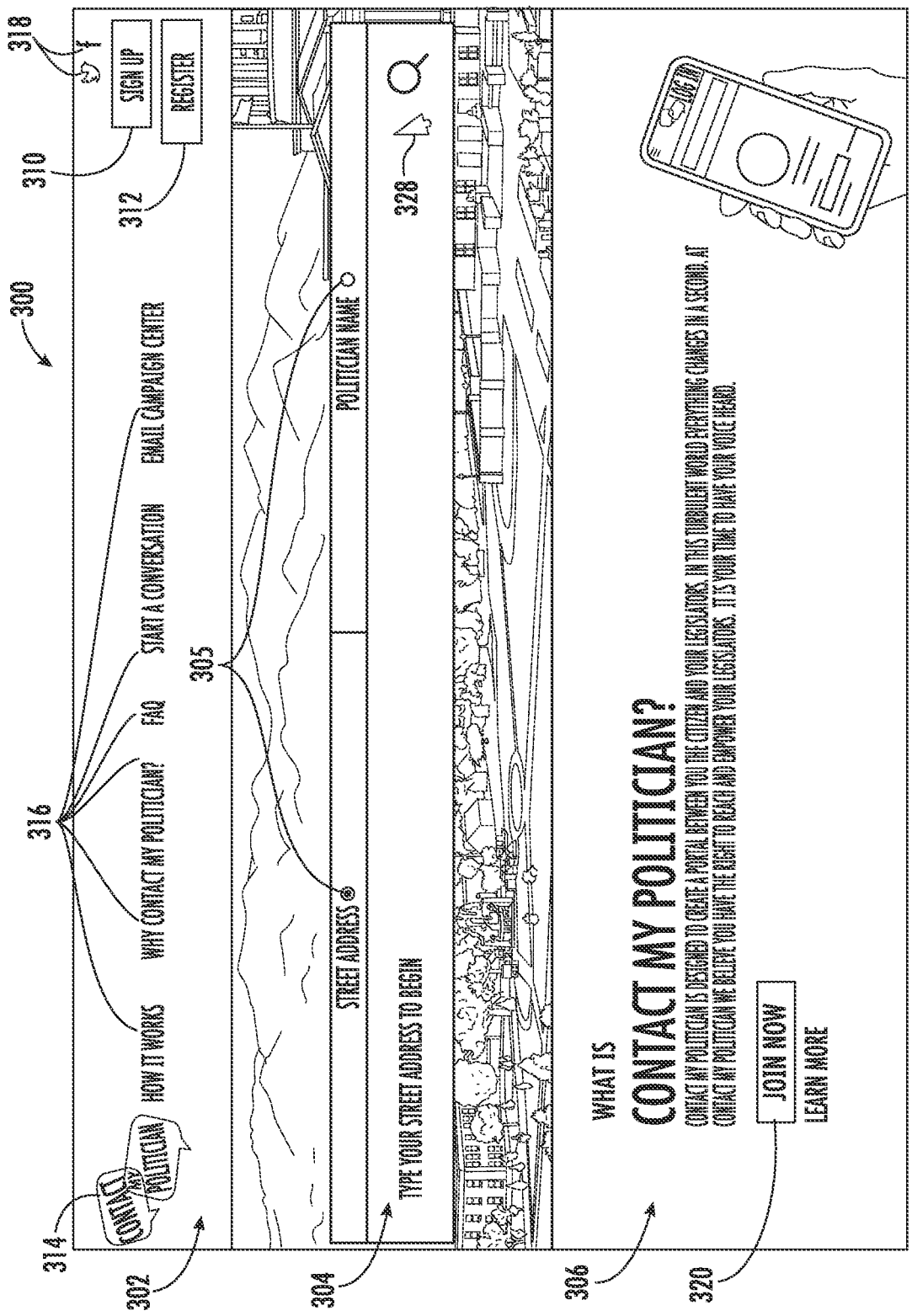
FIGS. 3A-3C are examples of a user interface page provided by the system of FIG. 1 according to an exemplary embodiment.
Figure 3B:
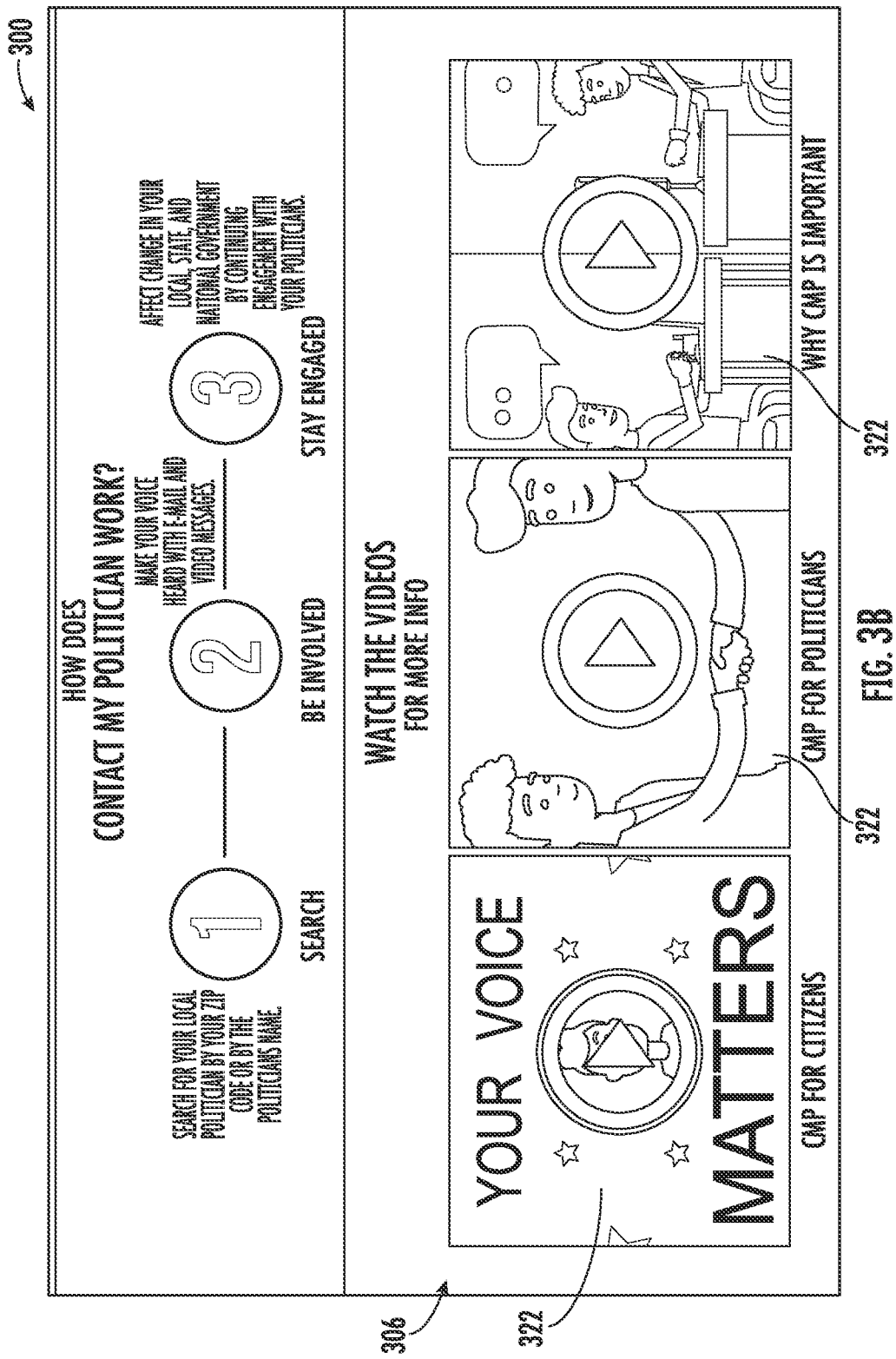
Figure 3C:
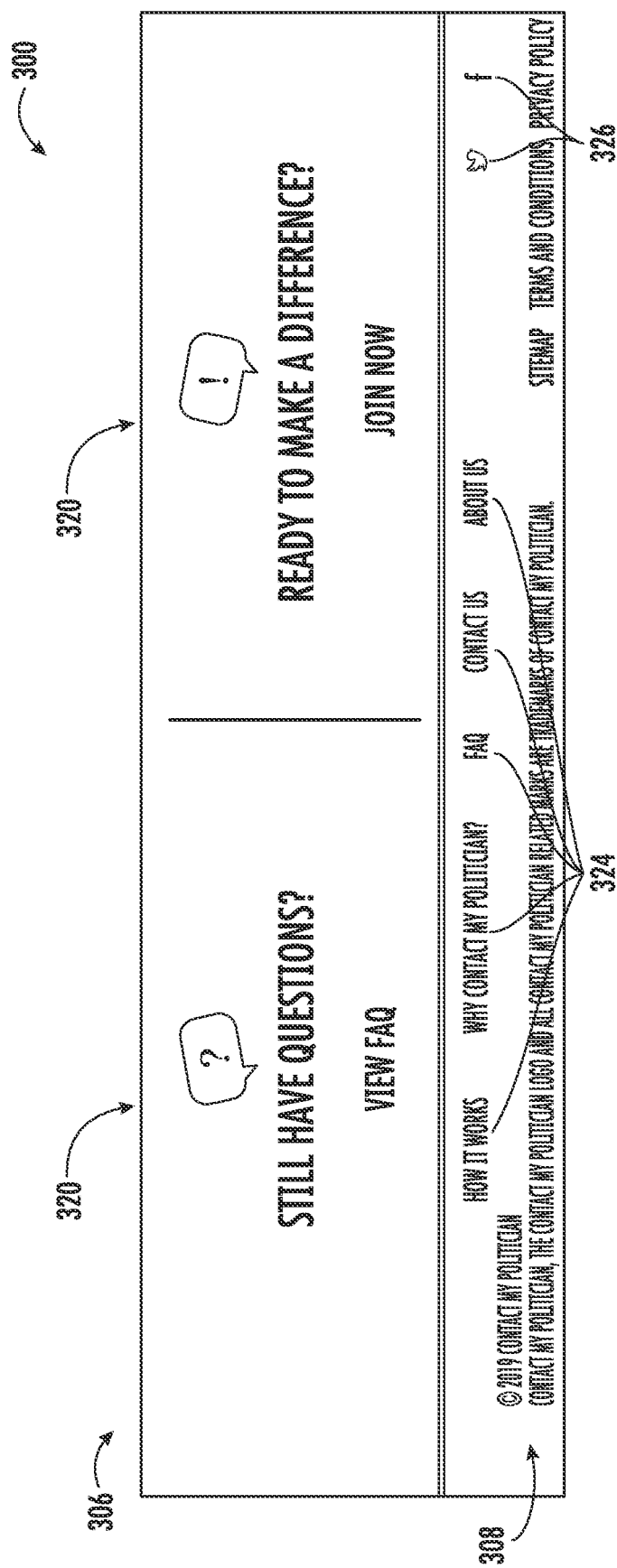

Referring first to FIGS. 3A-3C, an unregistered user home page 300 is shown. From the unregistered user home page 300, a user can access various links and/or query fields to obtain various information relating to government representatives and officials. The unregistered user home page 300 includes a header area 302, a search entry field 304, entry selection buttons 305 (e.g., radio buttons), an informational area 306, and a footer area 308.

The header area 302 includes a login link 310, a sign up or register link 312, a home page link 314, a plurality of header navigation links 316, and various social media links 318. The login link 310 and the register link 312 are configured to enable the user to log into or create a registered account on the MRSC application 114. In some instances, the home page link 314 is configured to navigate the user, depending on whether the user has logged into a registered account or not, to the unregistered user home page 300 or a user mailbox page 800 (shown in FIG. 8). In some other instances, regardless of whether the user is registered or logged in, the home page link 314 is configured to navigate the user to the unregistered user home page 300. Accordingly, in some instances, the unregistered user home page 300 may be the main home page for the MRSC application 114. The plurality of header navigation links 316 are configured to navigate the user to various pages of the Application Screens. For example, the header navigation links 316 is configured to navigate the user to a first informational page 400 (shown in FIG. 4), a second informational page 500 (shown in FIGS. 5A-5C), a third informational page 600 (shown in FIGS. 6A-6C), a conversation initiation page (shown as the new written message window 900 in FIG. 9A), and/or any other user interface pages accessible through additional header navigations links 316. The social media links 318 are configured to navigate the user to various social media accounts associated with the Application Screens.

The search entry field 304 is used by the user to enter a geographical indicator or a specific government representative name. The entry selection buttons 305 allow the user to choose between entering the geographical indicator (shown in FIG. 3A as a street address) and the specific government representative name. The geographical indicator is a street address, a 5-digit zip code, a 9-digit zip code, a city name, a county name, a district name, or any other suitable geographical indicator. As will be further discussed below, the search entry field 304 may be used to find a list of government representatives who represent the user based on the geographical indicator provided by the user or to find a specific government representative based on the specific government representative name provided by the user.

The informational area 306 includes various information about the Application Screens. Specifically, as illustrated, the informational area 306 includes various descriptive information, such as, for example, what the user can use the Application Screens for (shown in FIG. 3A) and how the Application screens work (shown in FIG. 3B). The informational area 306 can further include navigation links 320 and embedded informational videos 322. The navigation links 320 are configured to navigate the user to various user interface pages of the Application Screens and/or allow for the user to create a registered account. For example, the navigation links 320 are configured to navigate the user to the third informational page 600 and/or open a window for registering an account with the MRSC application 114. As illustrated, the embedded informational videos 322 provides additional information on how the Application Screens may be used by residents, how the Application Screens may be used by politicians, and why the Application Screens are important. In some embodiments, the embedded informational videos 322 includes various other types of information, as deemed appropriate by the developers.

The footer area 308 includes a plurality of footer navigation links 324 and various social media links 326. Similarly, the plurality of footer navigation links 324 are configured to navigate the user to various pages of the Application Screens. For example, the footer navigation links 324 are configured to navigate the user to the first informational page 400 (shown in FIG. 4), the second informational page 500 (shown in FIGS. 5A-5C), the third informational page 600 (shown in FIGS. 6A-6C), a Contact Us page configured to allow the user to contact the developers and/or owners of the Application Screens, an About Us page configured to provide information about the developers and/or owners of the Application Screens to the user, and/or any other user interface pages accessible through additional footer navigations links 324. The social media links 326 are similarly configured to navigate the user to various social media accounts associated with the Application Screens.

As will be described below, the header area 302 and/or the footer area 308 are included in several of the user interface pages provided by the MRSC application 114. Accordingly, the description of the header area 302 and/or the footer area 308 provided herein applies to the header area 302 and/or footer area 308 regardless of the user interface page it appears on. Further, although various user interface pages described and shown herein do not explicitly include or show the header area 302 and/or the footer area 308, it will be appreciated that the header area 302 and/or footer area 308 may be included on any user interface pages described herein.

Figure 4:
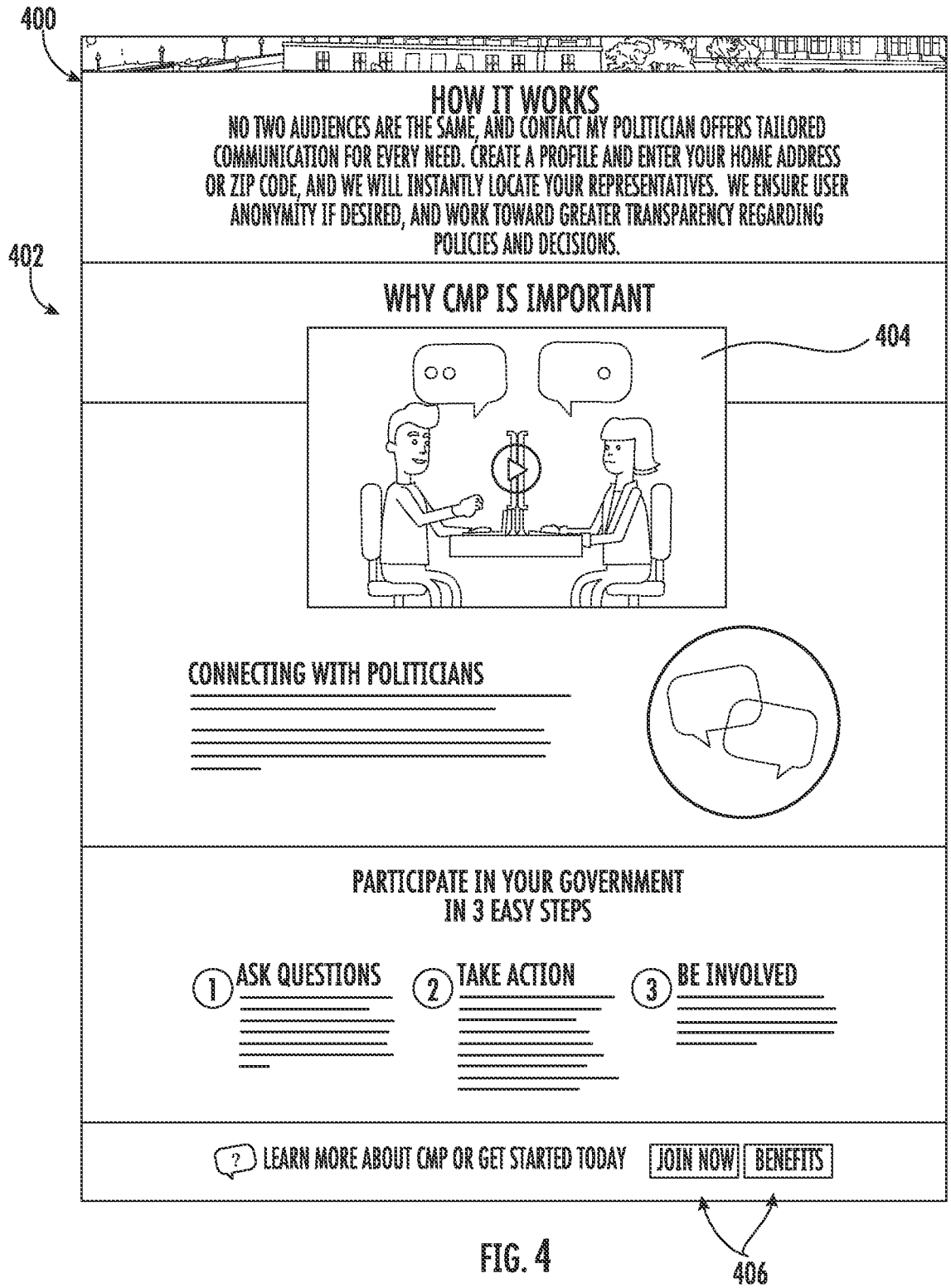
FIG. 4 is an example of another user interface page provided by the system of FIG. 1 according to an exemplary embodiment.

Referring now to FIG. 4, the first informational page 400 is shown. The user may navigate to the first informational page 400 using the header navigation links 316 in the header area 302, as alluded to above. Although not shown, the first informational page 400 similarly includes the header area 302, the search entry field 304, and the footer area 308. As illustrated in FIG. 4, the first informational page 400 includes an informational area 402 configured to display various additional information about the MRSC application 114. For example, the informational area 402 displays additional details regarding how the MRSC application 114 works, why the MRSC application 114 is important, and/or how the user can use the MRSC application 114 to participate in their government. The informational area 402 also includes an embedded video 404 and navigation links 406. The embedded video 404 is configured explain in further detail why the MRSC application 114 is important and how it can be beneficial to both the user and their government representatives. The navigation links 406 are similarly configured to navigate the user to various pages of the Application Screens and/or allow for the user to create a registered account.

Figure 5A:
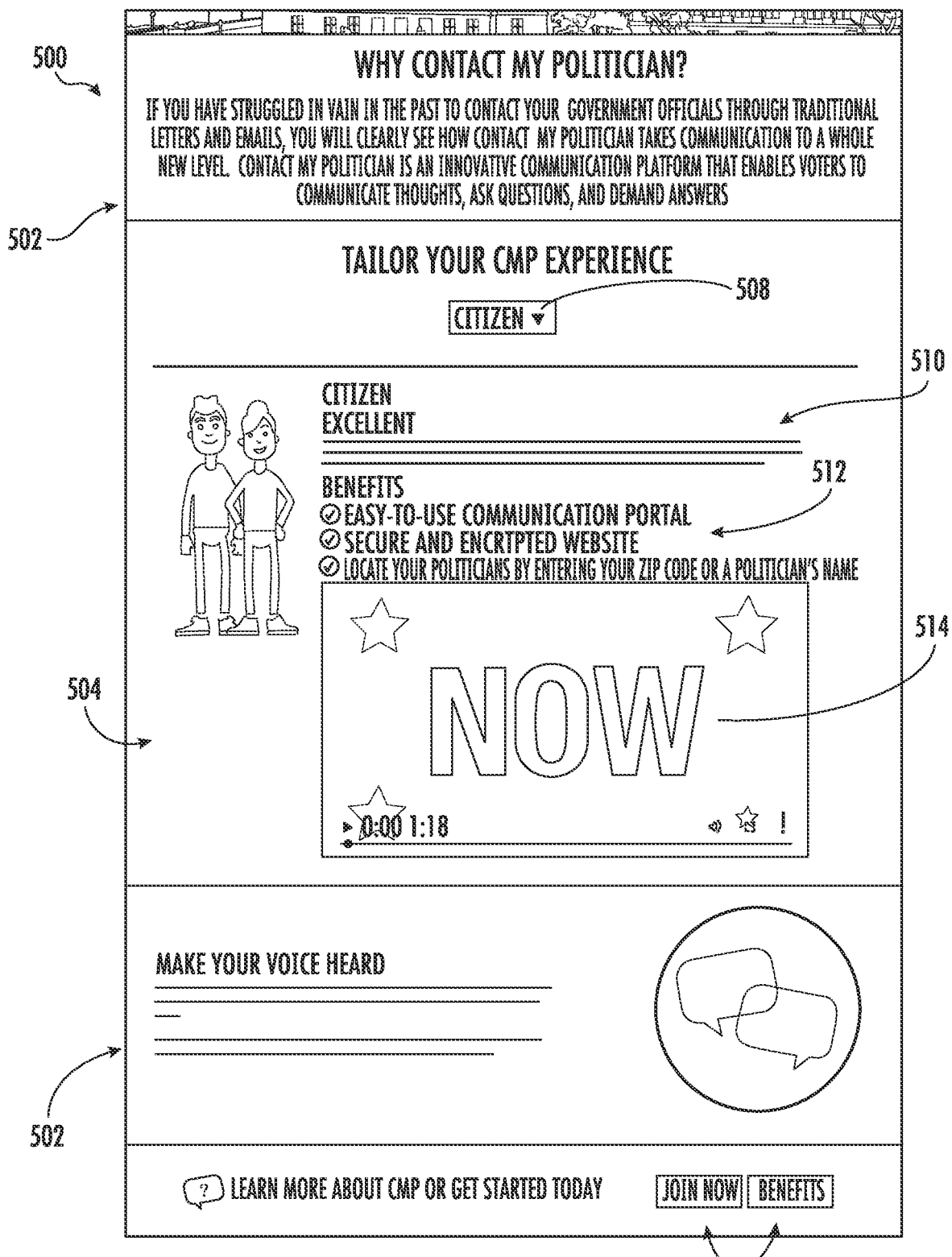
FIGS. 5A-5C are examples of another user interface page provided by the system of FIG. 1 according to an exemplary embodiment.
Figure 5B:
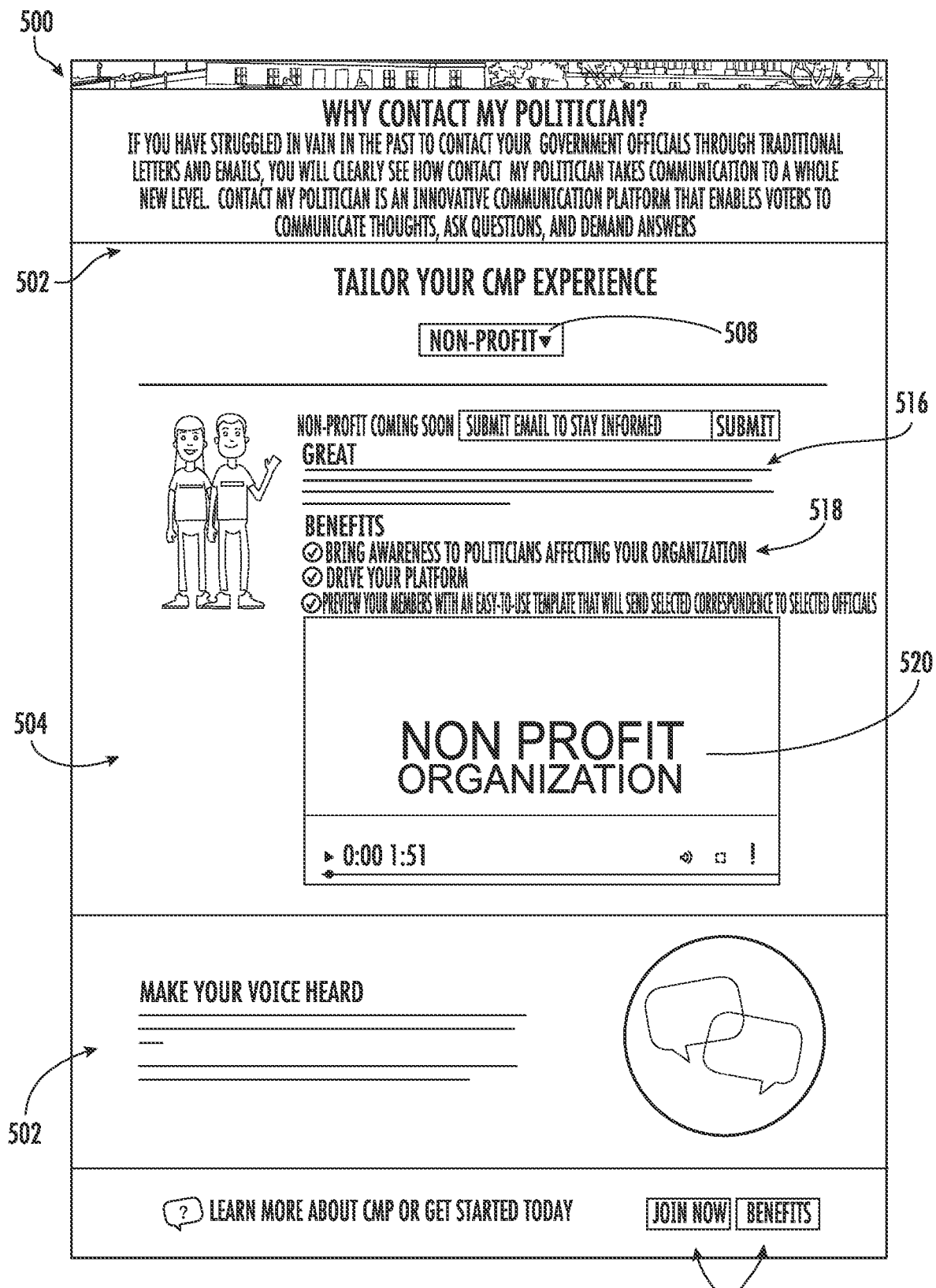
Figure 5C:
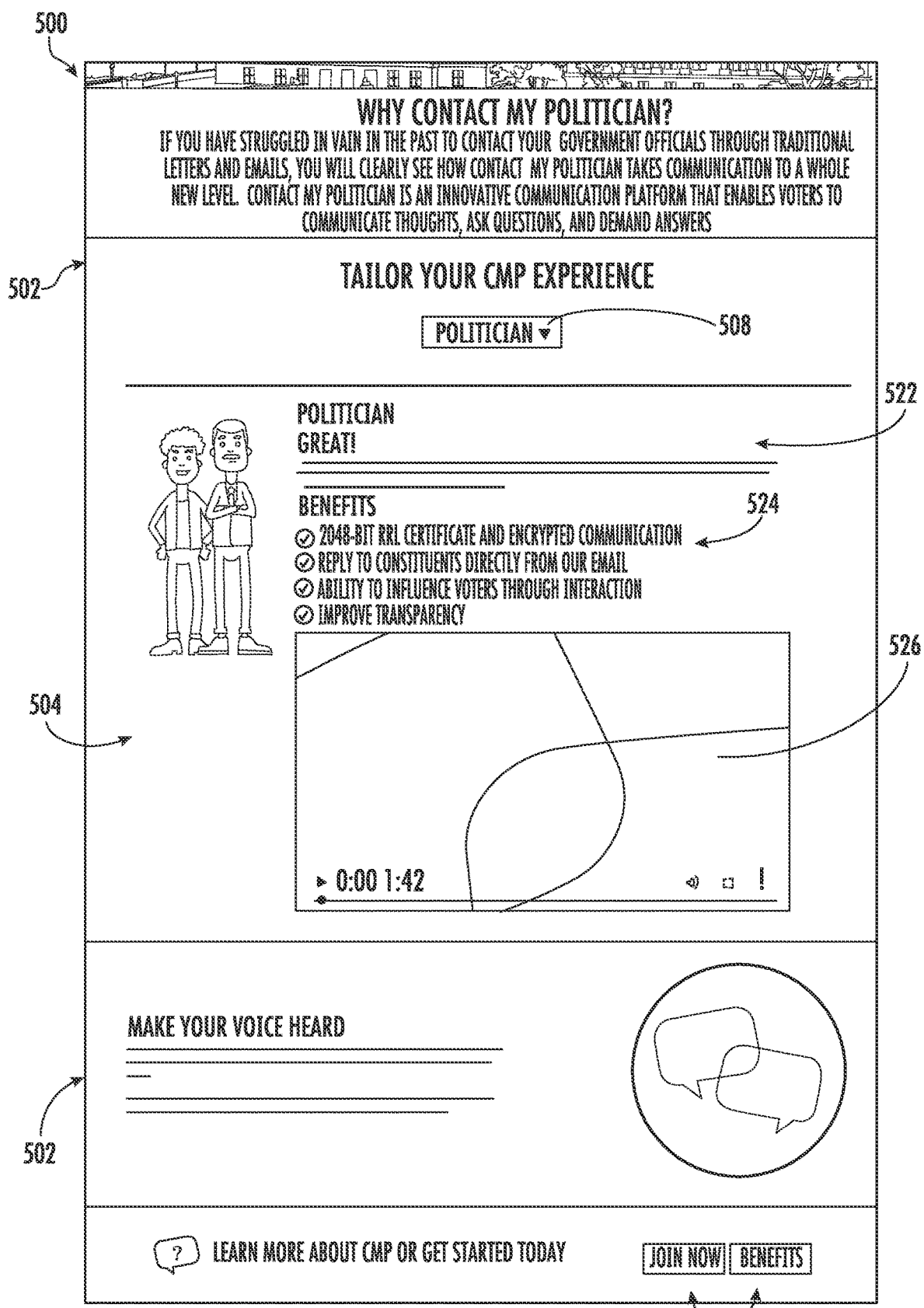

Referring now to FIGS. 5A-5C, the second informational page 500 is shown. The user may similarly navigate to the second informational page 500 using the header navigation links 316 in the header area 302, as alluded to above. Although not shown, the second informational 308. As illustrated in FIGS. 5A-5C, the second informational page 500 includes general informational areas 502 and a user-specific informational area 504. The general informational areas 502 are configured to display various additional information about the MRSC application 114. For example, the general informational areas 502 display additional details regarding the benefits of using the MRSC application 114 to provide a communication route between residents and government representatives. The general informational areas 502 are again include navigation links 506 that are configured to navigate the user to various user interface pages of the Application Screens and/or allow for the user to create a registered account.

The user-specific informational area 504 includes a user identifier field 508 configured to alter the user-specific informational area 504 based on a user identifier selected by the user. The user identifier comprises a citizen identifier, a non-profit identifier, or a politician identifier. FIG. 5A shows the user-specific informational area 504 once the user has indicated that they are a citizen. It should be appreciated that, in some instances, the term "citizen" may be replaced or accompanied by the term "resident" to account for both citizen and non-citizen residents. The user-specific informational area 504 includes a brief user-specific summary 510 of why the MRSC application 114 is beneficial to citizens (and/or residents). The user-specific informational area 504 further includes a list of citizen-specific (and/or resident-specific) benefits 512 associated with using the MRSC application 114 and an embedded video 514 that is directed toward the benefits of a citizen (and/or resident) using the MRSC application 114.

FIG. 5B shows the user-specific informational area 504 once the user has indicated that they are a non-profit. The user-specific informational area 504 includes a brief user-specific summary 516 of why the MRSC application 114 is beneficial to non-profits. The user-specific informational area 504 further includes a list of non-profit-specific benefits 518 associated with using the MRSC application 114 and an embedded video 520 that is directed toward the benefits of a non-profit using the MRSC application 114.

FIG. 5C shows the user-specific informational area 504 once the user has indicated that they are a politician. The user-specific informational area 504 includes a brief user-specific summary 522 of why the MRSC application 114 is beneficial to politicians. The user-specific informational area 504 further includes a list of politician-specific benefits 524 associated with using the MRSC application 114 and an embedded video 526 that is directed toward the benefits of a politician using the MRSC application 114.

Figure 6A:
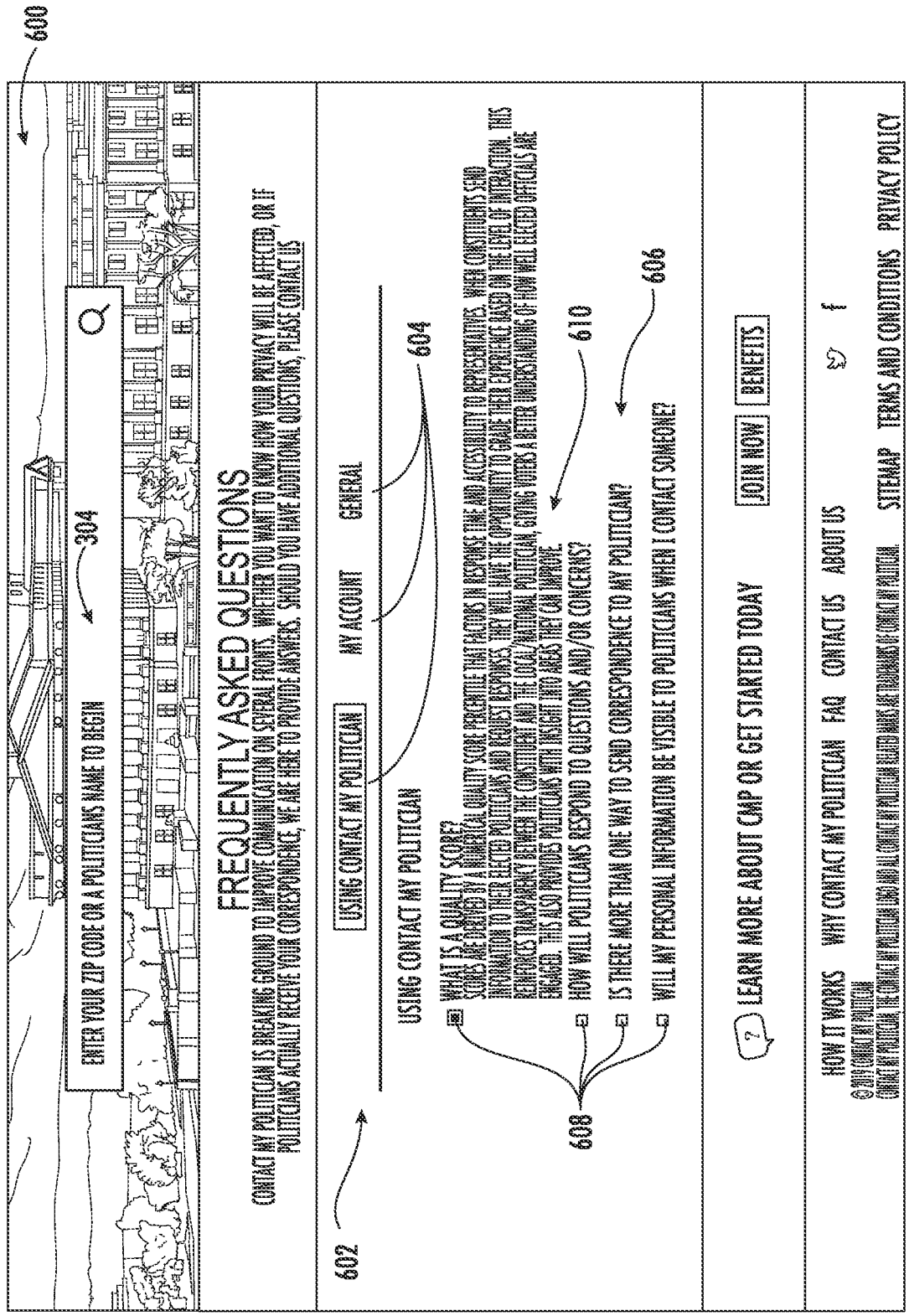
FIGS. 6A-6C are examples of another user interface page provided by the system of FIG. 1 according to an exemplary embodiment.
Figure 6B:
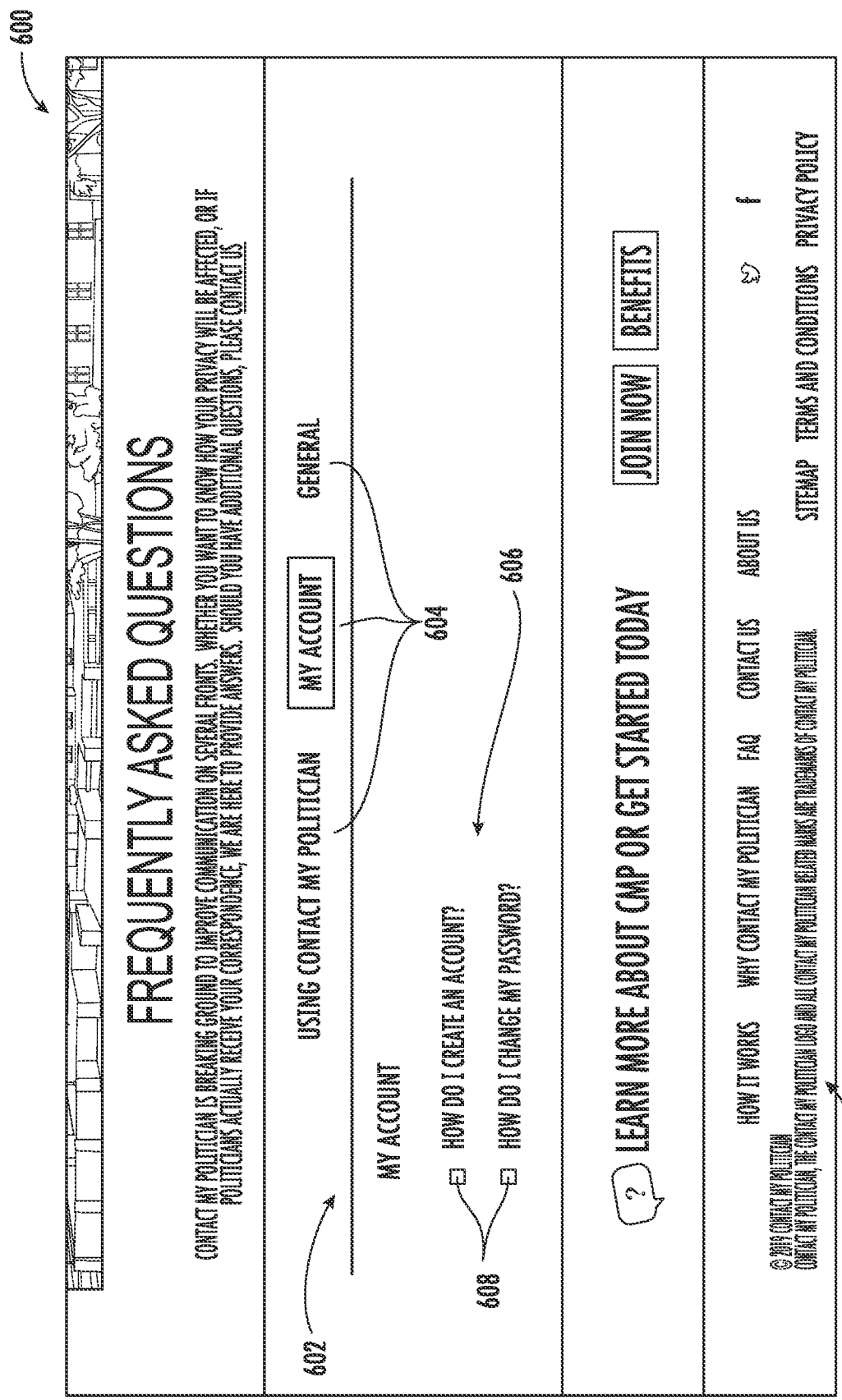
Figure 6C:
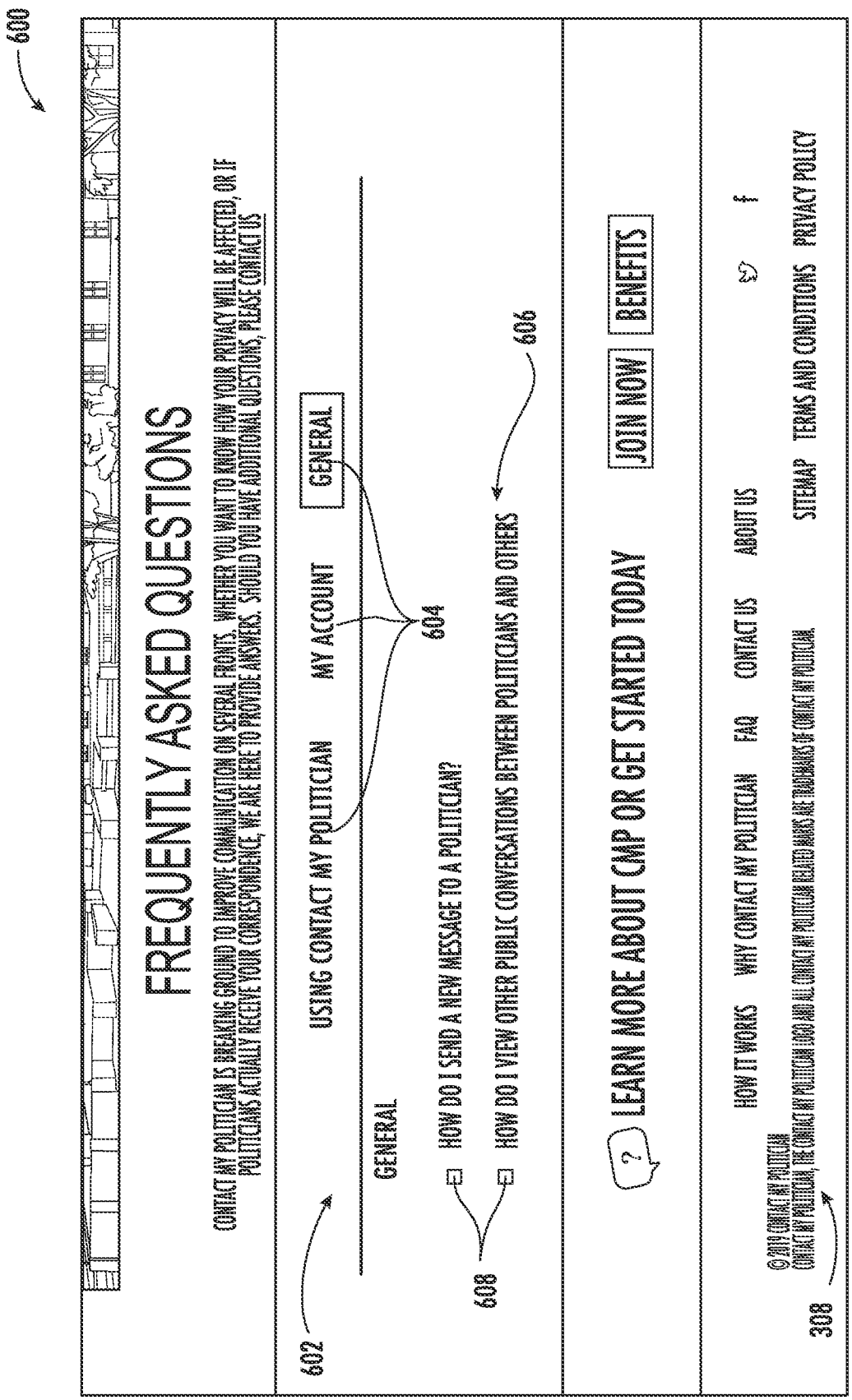

Referring now to FIGS. 6A-6C, the third informational page 600 is shown. The user may similarly navigate to the third informational page 600 using the header navigation links 316 in the header area 302, as alluded to above. Although not shown, the third informational page 600 similarly includes the header area 302. As illustrated in FIGS. 6A-6C, the third informational page 600 includes the search entry field 304, the footer area 308, and a user resource area 602. The user resource area 602 includes various category links 604 and an informational area 606. The category links 604 each pertain to various resource categories, and are labeled accordingly. In some embodiments, the category links 604 may be periodically updated by the developers based on user feedback. Clicking on different category links 604 is configured to update the informational area 606.

For example, as illustrated in FIGS. 6A-6C, the informational area 606 includes a plurality of user-provided questions 608 related to the various resource categories selected using the category links 604. After selecting a particular resource category, the user may click on one of the user-provided questions 608 to obtain a corresponding answer 610, which is provided in the informational area 606.

Figure 7A:
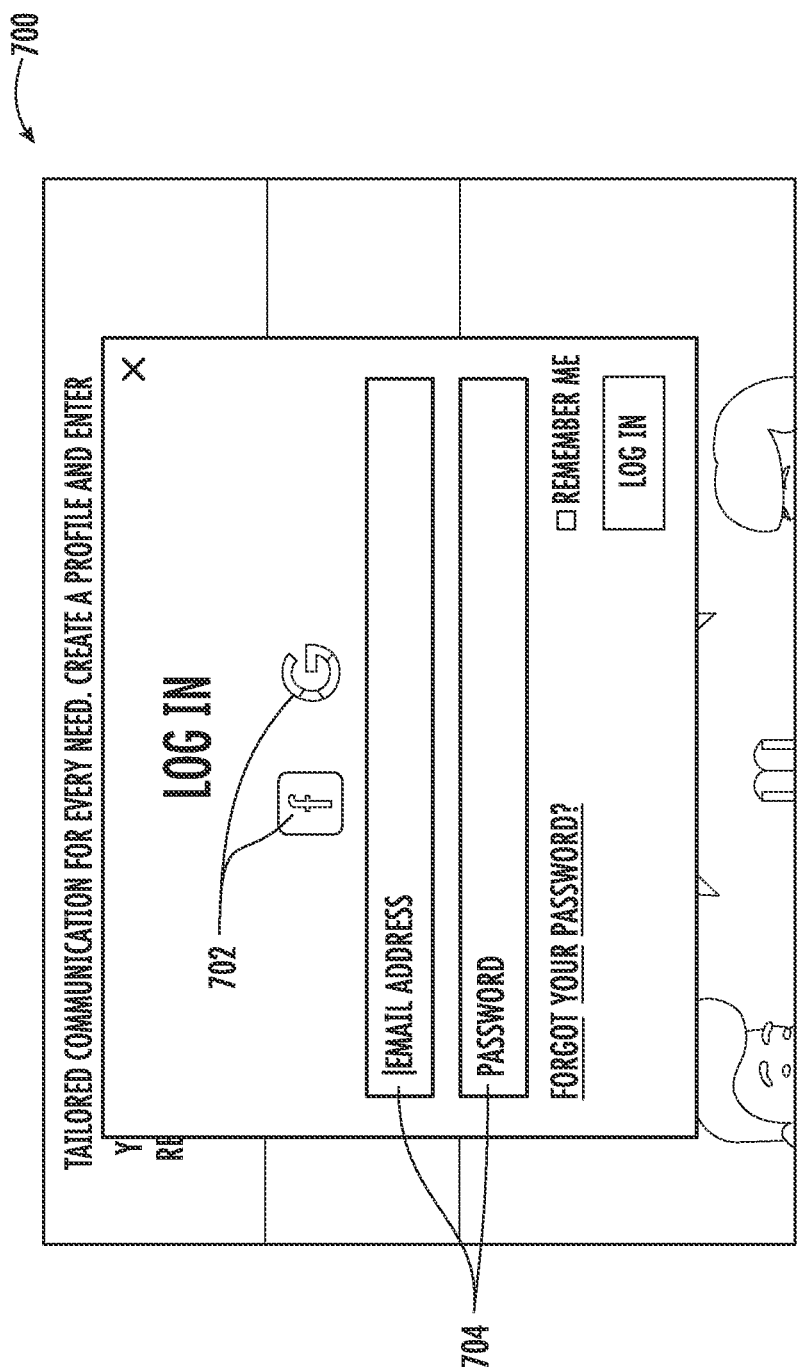
FIG. 7A is an example of a login popup window provided by the system of FIG. 1 according to an exemplary embodiment.
Figure 7B:
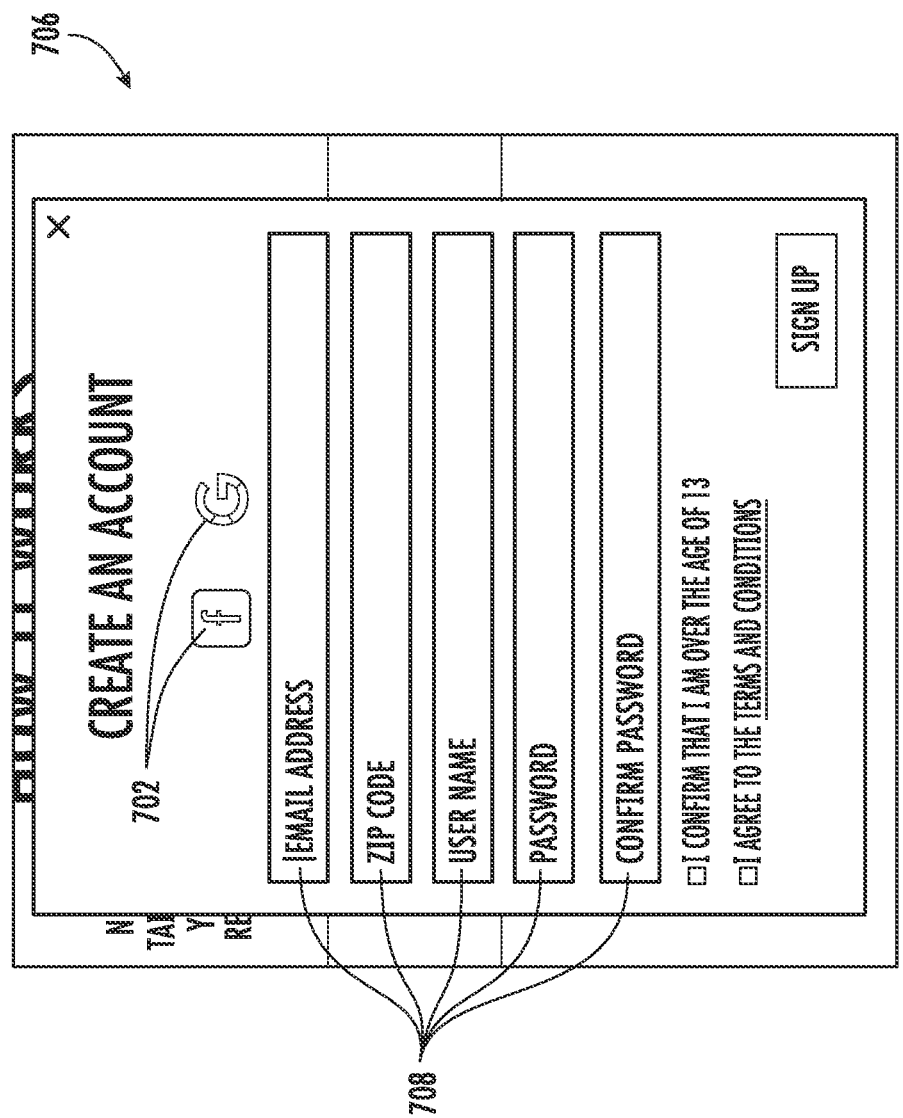
FIG. 7B is an example of a registration popup window provided by the system of FIG. 1 according to an exemplary embodiment.

Referring again to FIGS. 3A-3C, the login link 310 in the header area 302 is configured, upon being clicked by the user, to bring up a login popup window 700 (shown in FIG. 7A). Within the login popup window 700, the user can log into the MRSC application 114 through various automatic login links 702. As shown in FIG. 7A, the login links 702 include login links such as Facebook Login, Google Sign-in, or various other login links. In some instances, upon using the login links, the MRSC application 114 is configured to receive various additional information about the user (e.g., the user's address, zip code, state, city, etc.) from a remote server associated with the login link (e.g., Facebook or Google). This information may then be used to identify the user's government representatives, as described herein, without the need for the user to separately input this information elsewhere in the Application Screens. Alternatively, the user may enter login credentials into various login fields 704. In some embodiments, the login fields 704 are configured to receive a username and/or an email address and a password.

If the user hasn't already registered an account with the MRSC application 114, the user may instead click on the register link 312. The register link 312 is configured, upon being clicked by the user, to bring up an account registration popup window 706 (shown in FIG. 7B). Similarly, the user can log into the MRSC application 114 through various automatic login links 702. Alternatively, the user may enter registration information into various registration fields 708. In some embodiments, the registration fields 708 are configured to receive an email address, a zip code, a username, a password, and a redundant confirmation password.

Figure 8:
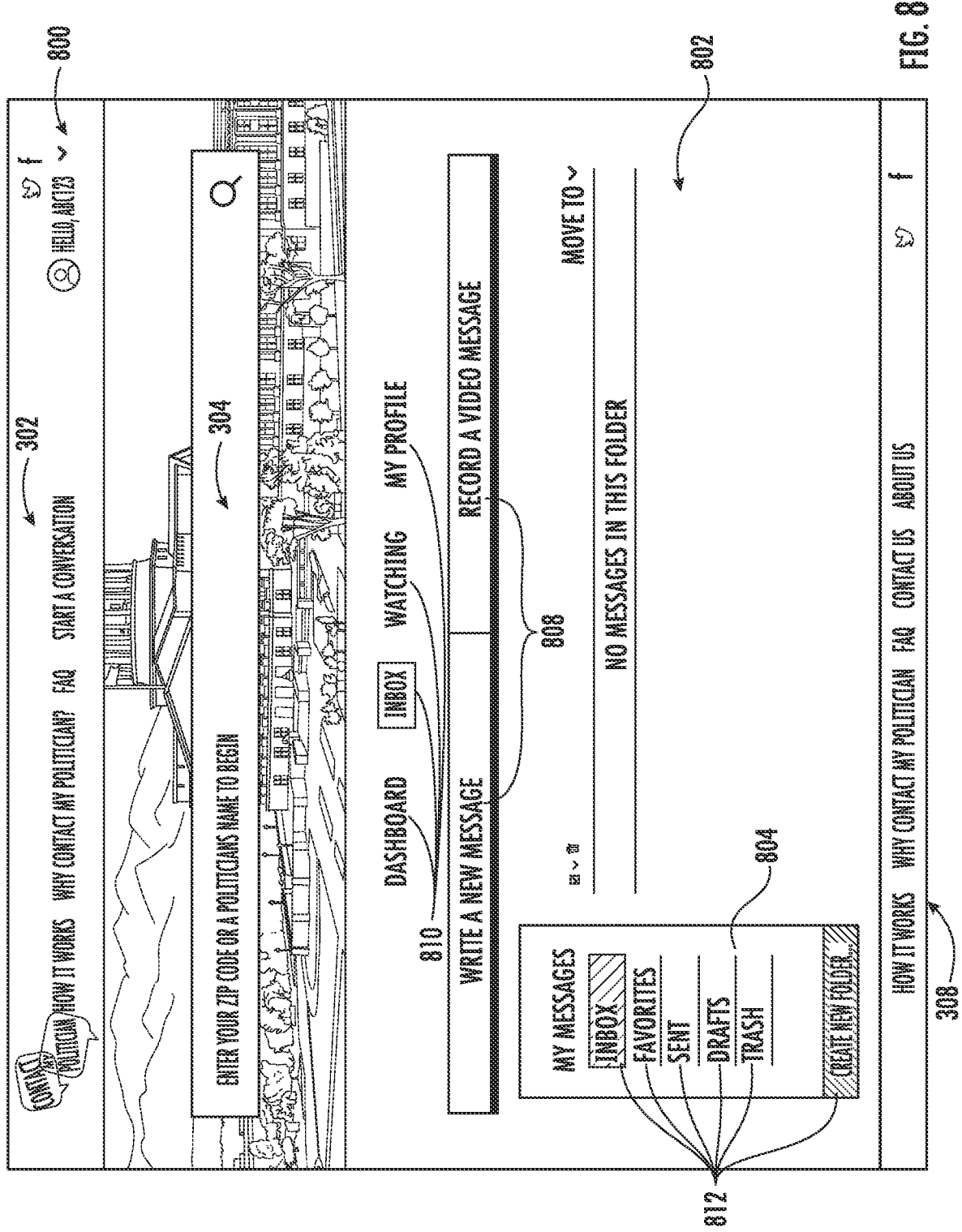
FIG. 8 is an example of a user mailbox page provided by the system of FIG. 1, showing a user message inbox, according to an exemplary embodiment.

As shown in FIG. 8, once the user has successfully registered an account and logged into the MRSC application 114, the user is automatically navigated to the registered user home page or a user mailbox page 800. The user mailbox page 800 includes the header area 302, the search entry field 304, a user mailbox area 802, and the footer area 308.

The user mailbox area 802 includes a mailbox navigation menu 804, a viewing pane 806, message creation links 808, and various user-related navigation links 810. The mailbox navigation menu 804 provides a plurality of mailbox folder links 812 configured to, upon being clicked by the user, open various folders (e.g., inbox, favorites, sent, drafts, trash, etc.) within of the user mailbox. Once a folder has been selected, its contents will be displayed in the viewing pane 806.

Figure 9A:
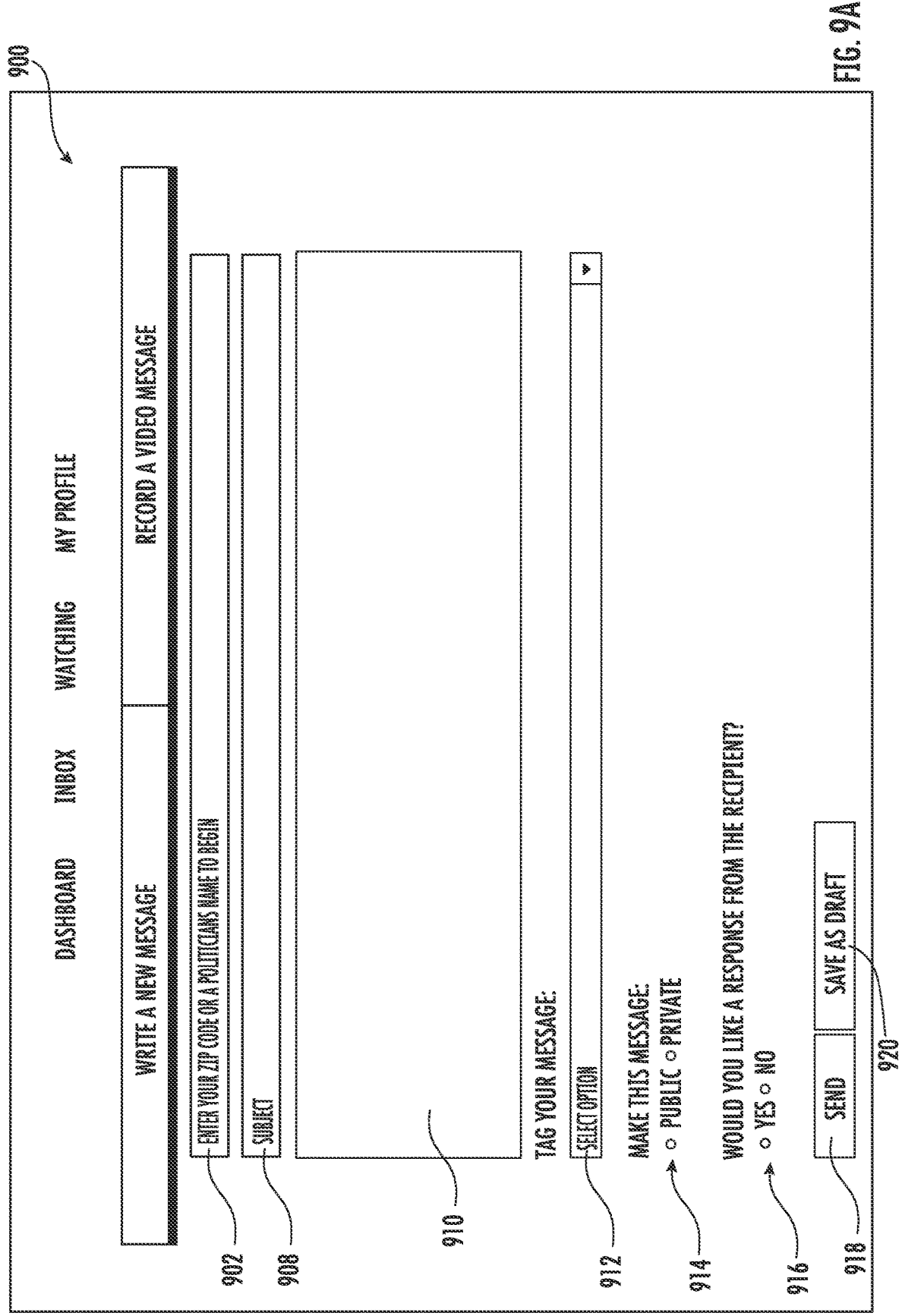
Figure 9B:
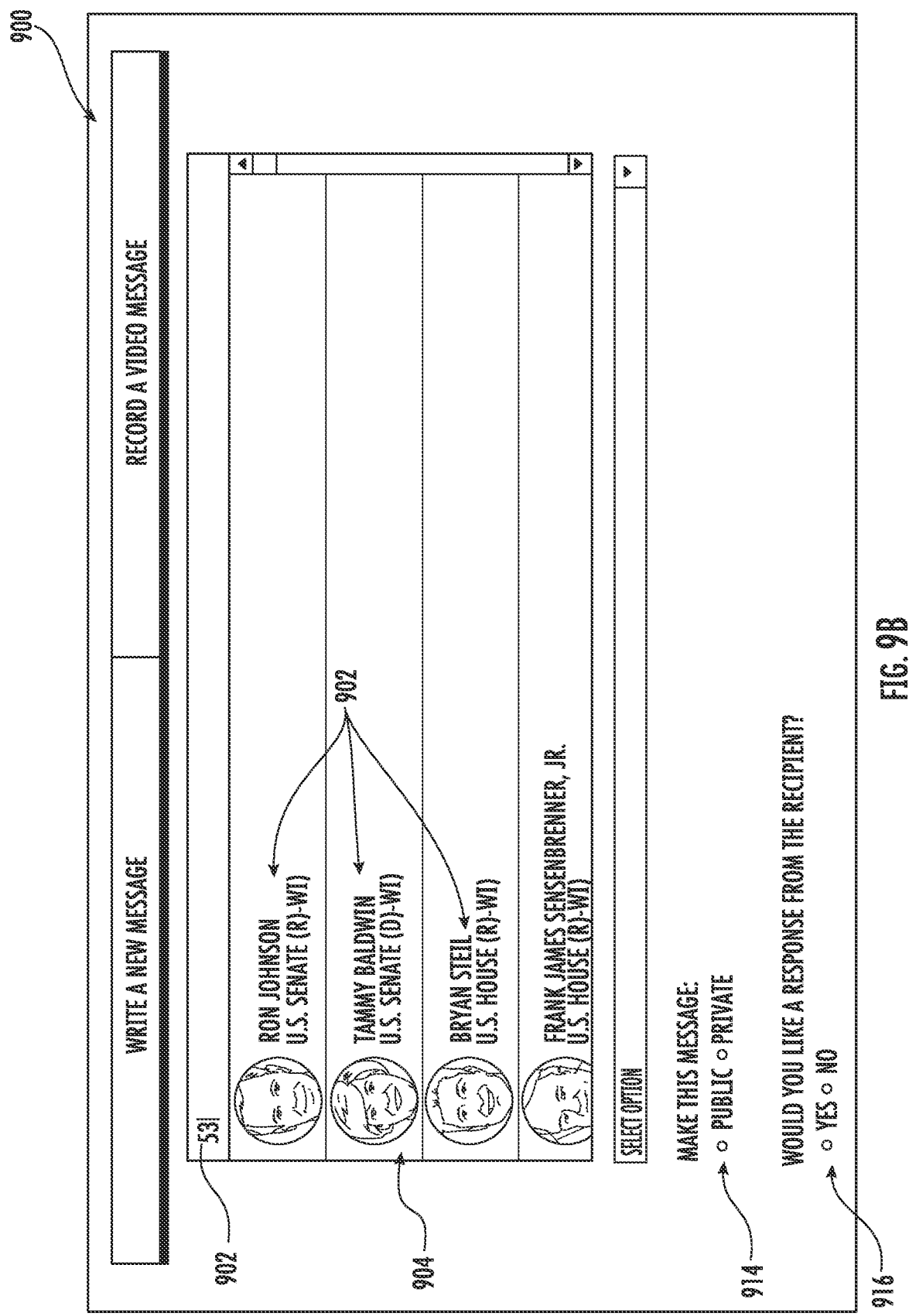

Using the message creation links 808, the user may select to create a new written message or to record a video message. If the user selects to create a new written message, the user is automatically navigated to a new written message window 900, as shown in FIG. 9A. At the new written message window 900, the user may provide a geographical indicator or a specific government representative name in a recipient search entry field 902. As shown in FIG. 9B, upon entry of a geographical indicator or a specific government representative name, a dropdown selection window 904 automatically appears, providing a list of potential government representative recipients 906. As illustrated, each potential government representative recipient 906 is listed using, for example, their name, a picture of their face, and a short description including their governmental position, political party affiliation, and the state of representation. For example, as shown in FIG. 9B, the first potential government representative recipient 906 listed is Ron Johnson, whose picture, governmental position (U.S. Senate), political party affiliation (Republican), and state of representation (WI) are all provided.

Once the user has selected one or more of the potential government representative recipients 906, the user may add a subject to their message in a subject field 908 and draft their message in a message body field 910. The user may also tag their message using various message tags provided in a message tag dropdown field 912. Selectable message tags include, for example, policy topics such as abortion, budget and spending, employment, crime, civil rights, drugs, economy, education, energy, ethics, environment, equal rights, campaign finance reform, foreign policy, gun control, healthcare, immigration, LGBTQ rights, poverty, social security, tax reform, trade policy, women's rights, and/or any other tag indicating a general topic of the message. The user may choose to make their message public or private using privacy buttons 914 and indicate whether they would like to receive a response from the selected government representative recipients 906 using response indicator buttons 916. The user may then send the message using the send button 918 or save the message as a draft using the save draft button 920.

Alternatively, using the message creation links 808, the user may instead select to create a recorded video message. Upon selecting to create a recorded video message, the user is automatically navigated to a new video message window 922, as shown in FIG. 9C. The new video message window 922 is substantially similar to the new written message window 900. For example, the new video message window 922 similarly includes the recipient search entry field 902, the subject field 908, the message tag dropdown field, privacy buttons 914, response indicator buttons 916, the send button 918, and the save draft button 920. However, the new video message window 922 includes a video upload field 924 configured to upload a video either using a camera or by selecting a stored video file. In some instances, the new video message window 922 includes the video upload field 924 instead of the message body field 910. In some other instances, the new video message window 922 includes both the video upload field 924 and the message body field 910. Accordingly, in some embodiments, the user mailbox page 800 includes a single message creation link 808 that automatically navigates the user to a combined written and video message window.

In some instances, when the user has tagged their message using the tag dropdown field 912, after sending their message, the user is shown various recent public conversations pertaining to the same policy topic or pertaining to the government representative they messaged. For example, if a user tags a message to their Congressional senator about gun rights, the MRSC application 114 is configured to show the user other related public conversations, such as other public conversations with that Congressional senator and/or public conversations with other government representatives of the user (e.g., the user's state senator, state representatives, mayor, etc.) that have also tagged gun rights.

Figure 10:
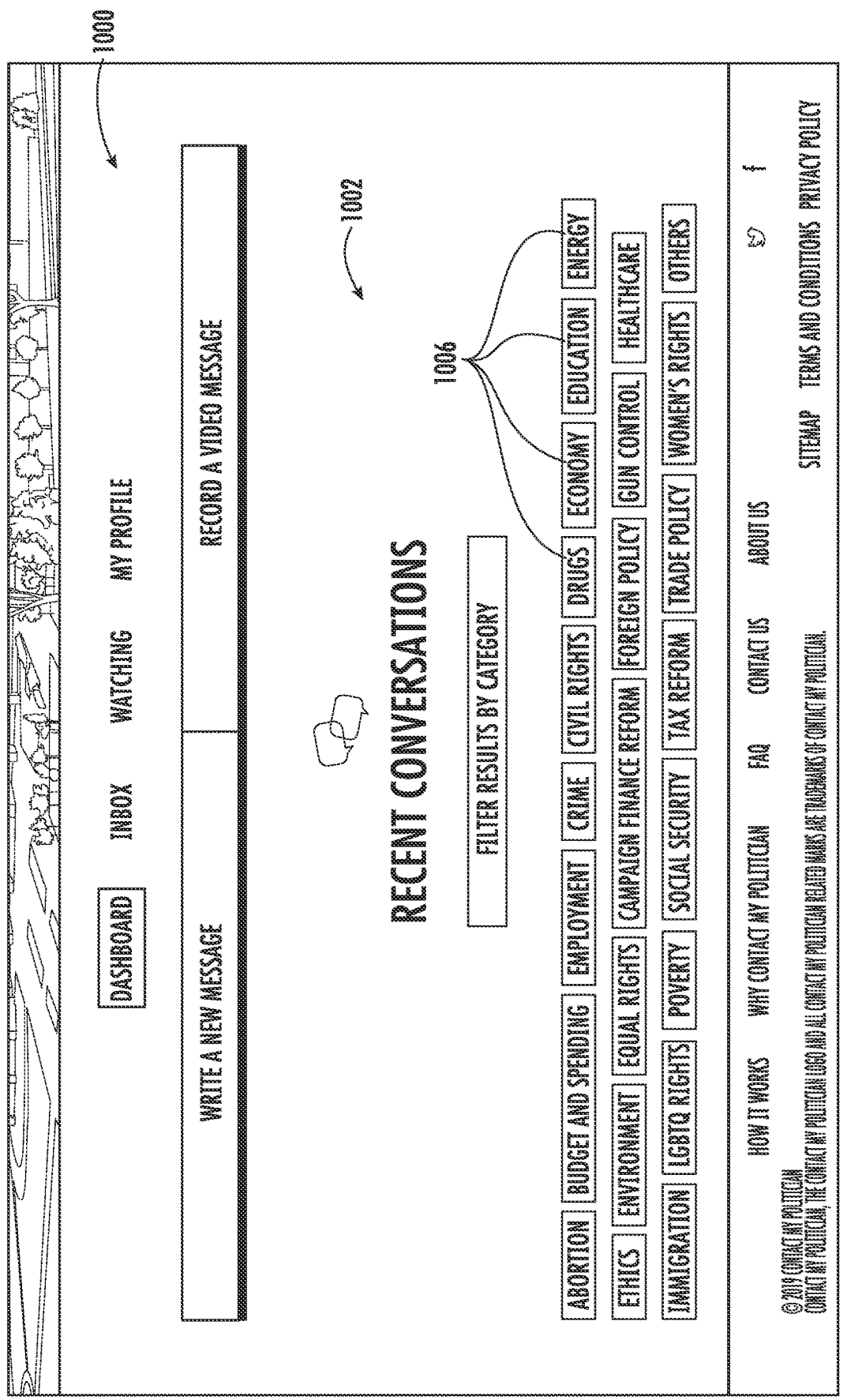
FIG. 10 is an example of a recent conversation dashboard page provided by the system of FIG. 1, showing a plurality of selectable conversation viewing filters, according to an exemplary embodiment.

Using the user-related navigation links 810, the user may choose to navigate to a dashboard page 1000, as shown in FIG. 10. The dashboard page 1000 similarly includes the message creation links 808 and the user-related navigation links 810. The dashboard page 1000 further includes a recent conversations reading pane 1002. The recent conversations reading pane 1002 is configured to display a list of recent public conversations (similar to recent conversations 1420 shown in FIG. 14B) and includes a plurality of category filter buttons 1006. The list of recent public conversations is a collection of saved and continuously updated conversations between various citizens and/or residents and various government representatives that are stored in the application server database 116, or elsewhere in the system 100, and accessed using the MRSC application 114.

Figure 16:
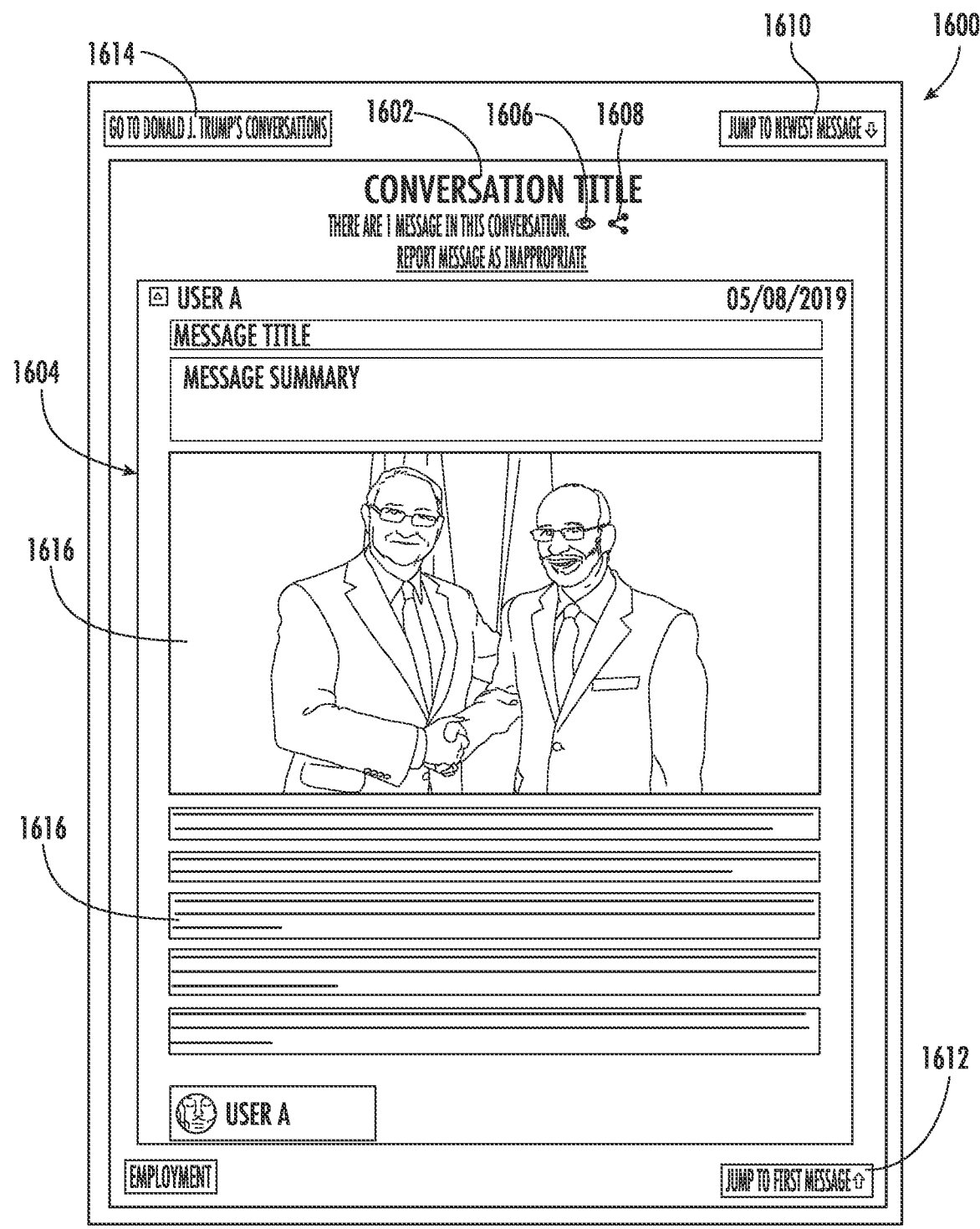
FIG. 16 is an example of a conversation page provided by the system of FIG. 1, showing a conversation between a user and an elected government official, according to an exemplary embodiment.

The user may select a particular public conversation to view by clicking on the public conversation and navigating to a conversation viewing page (similar to the conversation viewing page 1600 shown in FIG. 16). In some embodiments, the Application Screens are configured to allow the user to view the selected conversation, add the selected conversation to a watching list (as described below with reference to FIG. 11), or to share the selected conversation using various communication methods. The conversation may be shared over social media (e.g., Facebook, Instagram, Twitter, etc.), via email, via text messaging, or any suitable communication method. Although not explicitly depicted, in some instances, a user may further choose to allow other users to interact with their conversations. For example, if a user's conversation with a government representative is a public conversation, the user may additionally select an open conversation, thereby allowing other users to add responses of their own to the conversation. As such, in some embodiments, the public conversation is an open forum-type conversation allowing for multiple users to interact and/or respond to the conversation. That is, the user may start an open public conversation with a government representative, and other users may join in and add their own responses and comments to the conversation. Likewise, the user may join in and add their own responses and comments to other users' conversations. However, the user may alternatively select a closed public conversation, such that other users may view, watch, and/or share the conversation, but may not add responses of their own.

The plurality of category filter buttons 1006 are configured to filter the list of recent conversations based on the selected message tags (e.g., tags selected from the message tag dropdown field 912 discussed above). For example, if a user wants to view recent conversations including one or more of their government representatives and regarding a particular topic or several topics of interest, the user may simply click one or more of the category filter buttons 1006 to remove conversations that are not of interest to the user from the recent conversations reading pane 1002. Accordingly, the user may organize or group conversations by policy topics of most interest to the user, identify government officials based on their conversations regarding various policy topics. Further, in some instances, the various category filter buttons 1006 may be sorted and/or organized based on a reverse chronological order associated with their creation or addition. The policy topics may be listed in order of when they were created or added, from newest to oldest. In some other instances, the various category filter buttons 1006 may be continuously sorted and/or organized according to which policy topics are trending (e.g., the most talked about policy topics are displayed near the front or top of the list and the least talked about policy topics are displayed near the end or bottom of the list). Additionally, the user may filter various conversations based on policy topics, identify their government representatives who have had recent conversations regarding particular policy topics, and subsequently send messages to all of their government representatives (e.g., the government representatives representing the user based on the geographic indicator, as described herein) simultaneously.

In some embodiments, the list of recent conversations may additionally be searchable using keywords provided in a keyword search field (not shown), allowing for the user to search for a particular word, phrase, or policy topic not included in the plurality of category filter buttons 1006.

Figure 11:
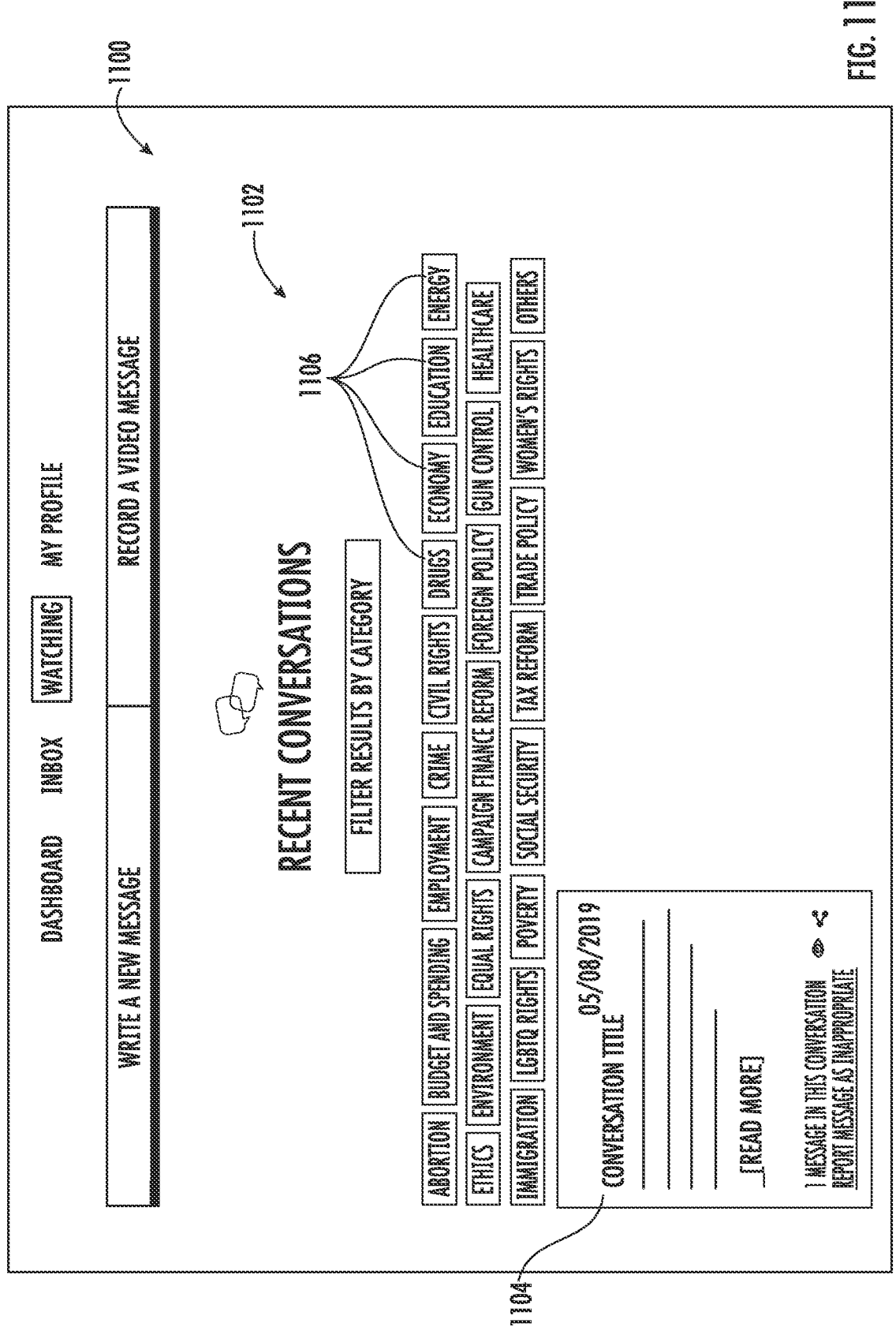
FIG. 11 is an example of a watched conversation page provided by the system of FIG. 1, showing a plurality of selectable conversation viewing filters, according to an exemplary embodiment.

Similar to the dashboard page 1000 above, using the user-related navigation links 810, the user may choose to navigate to a watching page 1100, as shown in FIG. 11. The watching page 1100 similarly includes the message creation links 808 and the user-related navigation links 810. The watching page 1100 further includes a watched conversations reading pane 1102. The watched conversations reading pane 1102 is configured to display a list of preselected conversations 1104 and similarly includes a plurality of category filter buttons 1106. The list of preselected conversations 1104 are displayed based on previous activity by the user. That is, while viewing a conversation, the user may select to "watch" that conversation. The user may select to "watch" a particular conversation 1104 to easily track and monitor the development of the conversation 1104 over time. In some embodiments, the user may select to "watch" trending public conversations, determined based on policy topic views and/or conversation views, of other users in the user's district (e.g., based on similar geographic indicators). The plurality of category filter buttons 1106 function similarly to the plurality of category filter buttons 1006 described above to remove conversations that are not of interest to the user from the watched conversations reading pane 1102.

Again, using the user-related navigation links 810, the user may choose to navigate to a profile page 1200, as shown in FIGS. 12A-12D. The profile page 1200 includes a profile status area 1202, a profile pane menu area 1204, a contact pane 1206 (shown in FIG. 12A), a personal pane 1208 (shown in FIG. 12B), a politics pane 1210 (shown in FIG. 12C), and a password pane 1212 (shown in FIG. 12D). The profile status area 1202 includes a status percentage 1214 based on the amount of information the user has entered into the profile page 1200. The status percentage 1214 serves as a reminder and a motivator for the user to complete the entry of their profile information into the profile page 1200. The profile pane menu area 1204 includes a plurality of pane options 1216 configured to allow the user to selectively access the contact pane 1206, the personal pane 1208, the politics pane 1210, and the password pane 1212.

Figure 12A:
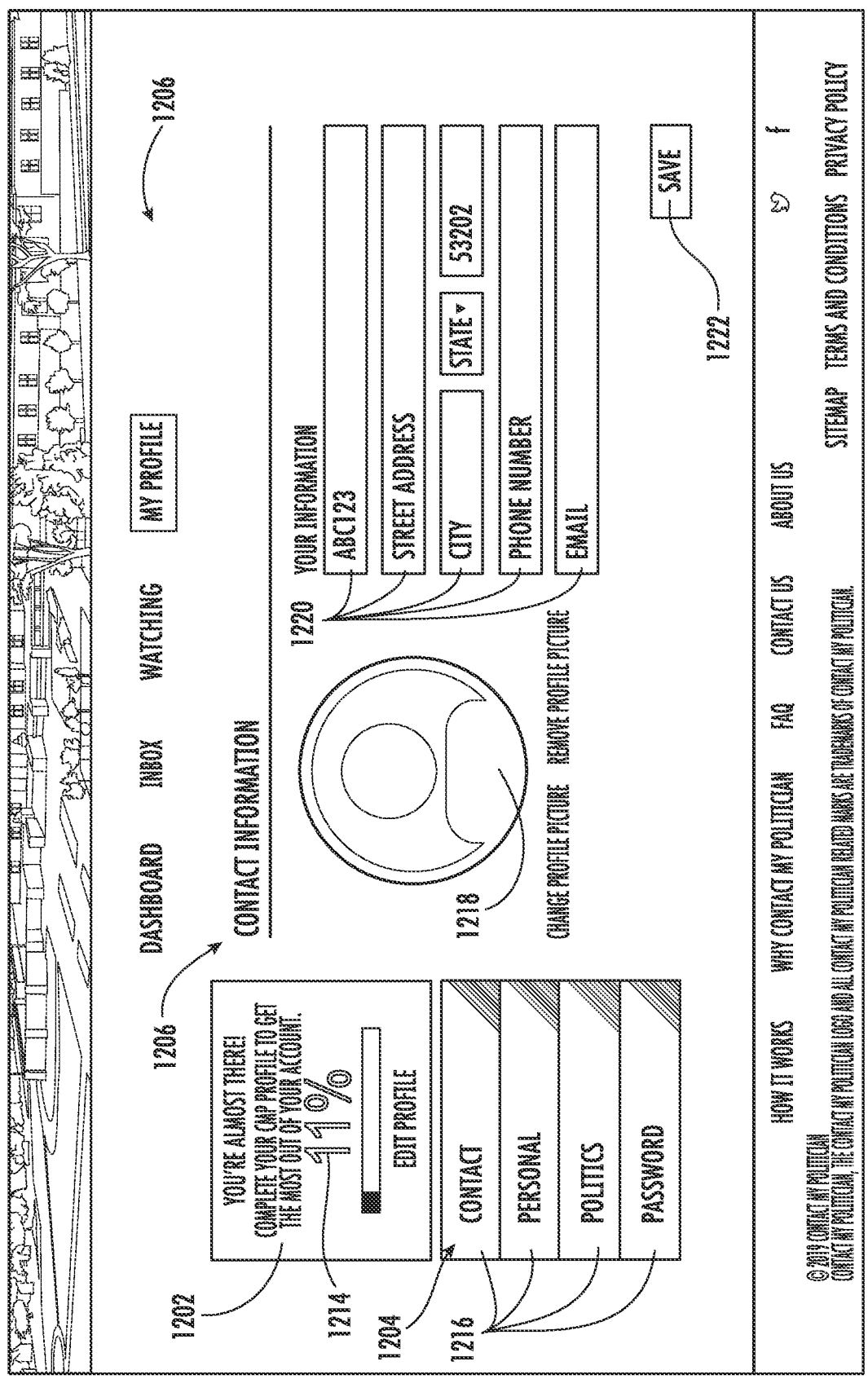
FIGS. 12A-12D are examples of a user profile creation page provided by the system of FIG. 1 according to an exemplary embodiment.

Referring now to FIG. 12A, the contact pane 1206 includes a profile picture field 1218 and a plurality of contact information fields 1220. The profile picture field 1218 is configured to allow the user to upload, change, and remove a profile picture to their account. The profile picture is associated with the user's account and is displayed with various messages sent by the user. The contact information fields 1220 are configured to receive input from the user in the form of various contact information. For example, the contact information fields 1220 are configured to receive a username, a street address, a city, a state, a 5-digits zip code, a 9-digit zip code, a phone number, an email address, and/or any other pertinent contact information deemed necessary by the developers. Once the user has entered all or part of the contact information into the contact pane 1206, the user may save their information by clicking on the save button 1222.

Figure 12B:
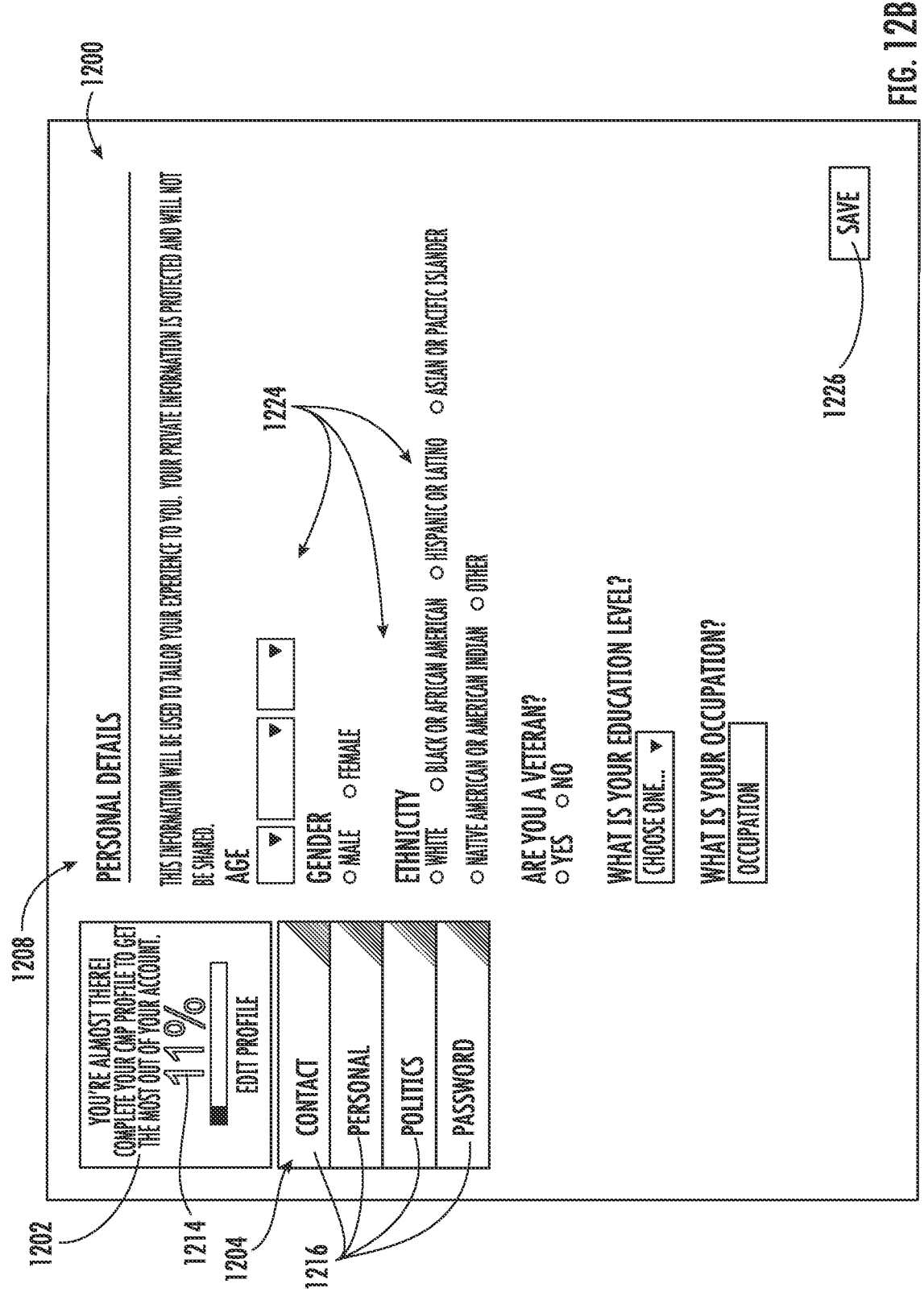

Referring now to FIG. 12B, the personal pane 1208 includes a plurality of personal information fields 1224. The personal information fields 1224 are configured to receive input from the user in the form of various personal information. For example, the personal information fields 1224 is configured to receive a birth date of the user, a gender of the user, an ethnicity of the user, an indication of whether the user is a veteran, an education level of the user, an occupation of the user, and/or any other pertinent personal information deemed necessary by the developers. Once the user has entered all or part of the personal information into the personal pane 1208, the user may save their information by clicking the save button 1226.

Figure 12C:
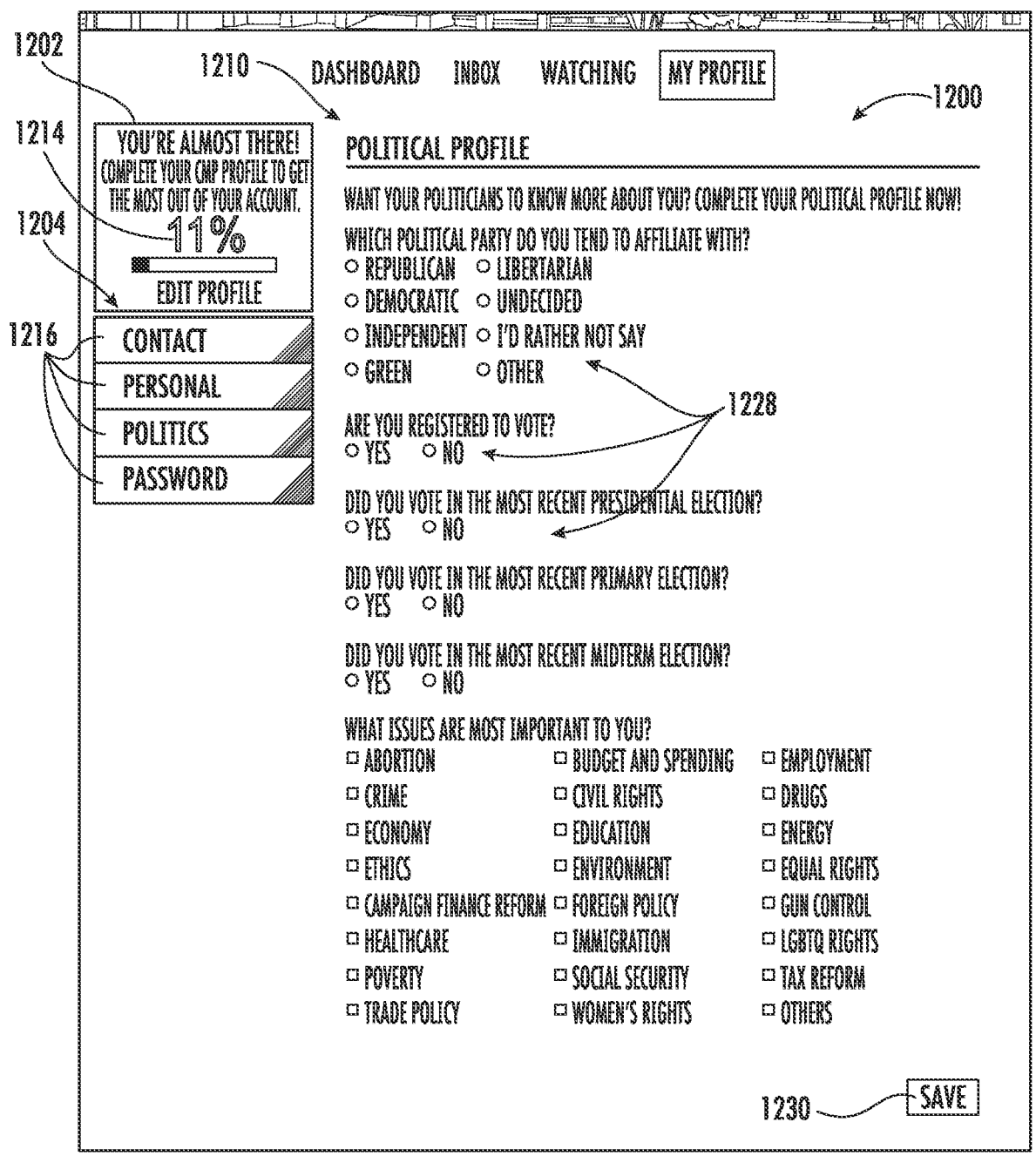

Referring now to FIG. 12C, the politics pane 1210 includes a plurality of political information fields 1228. The political information fields 1228 are configured to receive input from the user regarding various information about their political views. For example, the political information fields 1228 are configured to receive an indication of which political party the user tends to affiliate with, an indication of whether the user is registered to vote, an indication of whether the user voted in the most recent presidential election, an indication of whether the user voted in the most recent primary election, an indication of whether the user voted in the most recent midterm election, an indication of various issues that are most important to the user, and/or any political information deemed necessary by the developers. Once the user has entered all or part of the political information into the politics pane 1210, the user may save their information by clicking the save button 1230.

In some embodiments, various aspects of the saved contact, personal, and/or political information are stored in the application server database 116 and selectively accessed by the MRSC application 114 to enhance and/or expedite the user experience. For example, the contact, personal, and/or political information are used to autofill various search fields while the user is navigating through the Application Screens.

Figure 12D:
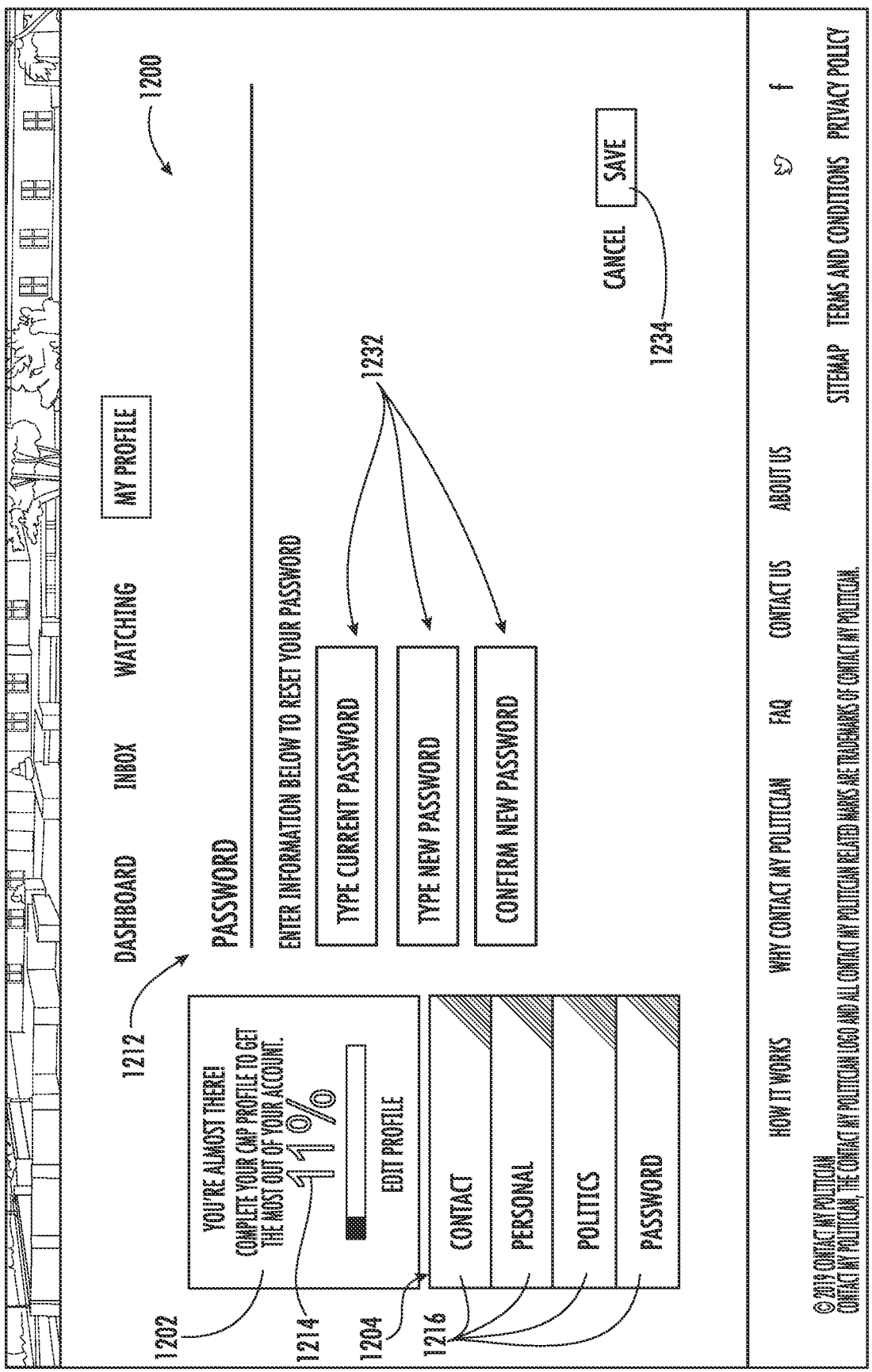

Referring now to FIG. 12D, the password pane 1212 includes a plurality of password reset fields 1232. The password reset fields 1232 are configured to be used by the user to selectively reset their password. Once the user has reset their password, they may save their new password by clicking the save button 1234.

Figure 13:
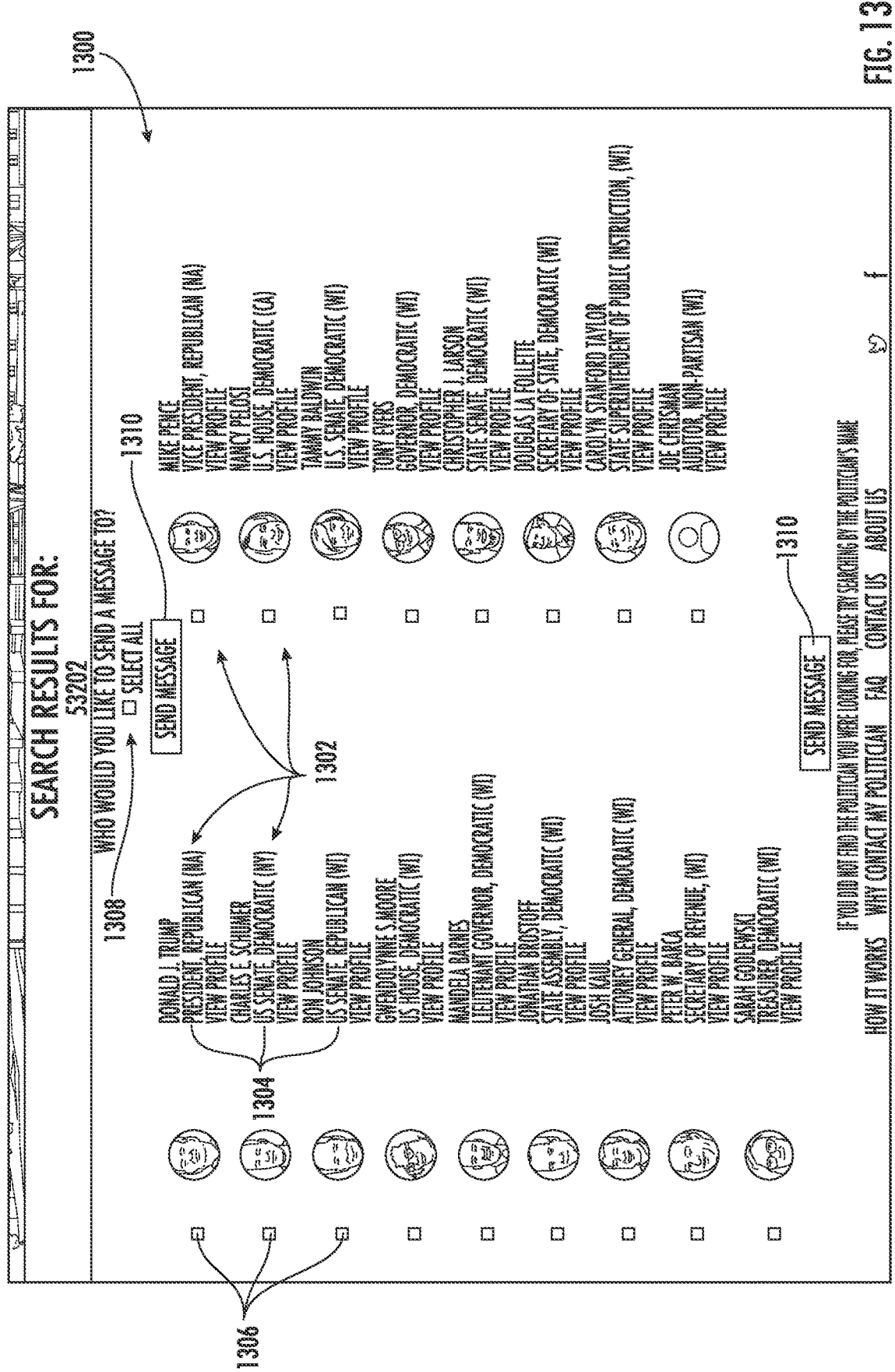
FIG. 13 is an example of a search results page provided by the system of FIG. 1, showing a list of identified government officials determined using a geographical indicator, according to an exemplary embodiment.

Referring now to FIG. 13, a search results page 1300 is shown. As alluded to above, the search entry field 304 is used by the user to enter a geographical indicator or a specific government representative name, which is used by the MRSC application 114 to find at least one government representative 1302 based on the geographical indicator and/or government representative name provided by the user. In some instances, the Application Screens are configured to identify federal, state, and/or local representatives, depending on the granularity (e.g., the specificity of the user's location) of the geographical indicator provided by the user. As indicated above, the geographical indicator is a street address, a 5-digit zip code, a 9-digit zip code, a city name, a county name, a district name, or any other suitable geographical indicator.

In some embodiments, varying levels of government representatives may be identified based on the type of geographical indicator provided. For example, if a 5-digit zip code is provided, the city of residence of the user may be determined, and a list of representatives including the president down to the mayor and/or general city council members may be identified. However, a 5-digit zip code may not be specific enough to determine which particular district the user resides in, such that various local government representatives (e.g., aldermen) may not be identified. A 9-digit zip code, which identifies a geographic segment within the 5-digit zip code, may be granular enough to identify such local government representatives.

In some embodiments, if the user has entered a 5-digit zip code and has attempted to message a particular local government representative (e.g., an alderman) in the past, the MRSC application 114 is configured to infer a certain district based on both the 5-digit zip code and the previously-contacted government representative. Further, if the user attempts to contact a local government representative (e.g., a mayor, a city council member, an alderman, etc.), the MRSC application 114 is configured to infer additional federal and state government representatives (e.g., state governor, state congressional members, etc.) of the user based on the local government representative contacted.

As illustrated, each government representative 1302 is listed using, for example, their name, a picture of their face, and an abbreviated description including their governmental position, political party affiliation, and the state of representation. For example, as shown in FIG. 13, the first listed government representative 1302 is Donald Trump, whose picture, governmental position (President), and political party affiliation (Republican) are all provided. Donald Trump is the President, which is not state specific, so the state of representation doesn't apply to him. As such, "NA" is provided where the state of representation information is typically provided. Each government representative 1302 further includes a profile link 1304 configured to navigate the user to the profile of the corresponding government representative 1302, as will be discussed below.

In some instances, the MRSC application 114 determines the at least one government representative 1302 or list of government representatives 1302 (as shown in FIG. 13) through use of at least one of the various APIs 118 of the system 100. The APIs 118 include a variety of APIs configured to provide a variety of information and functionality to the MRSC application 114 from the various remote servers 106. The remote servers 106 are global, national, and/or local content providers such as, for example, Google, Facebook, Amazon, etc. For example, one API 118 used for determining and providing the at least one government representative 1302 comprises the Google Civic Information API. The Google Civic Information API allows for a U.S. residential address to be used to look up who represents that address at each elected level of government. Another API 118 used is the Sunlight Congress API. The Sunlight Congress API allows for the lookup of government representatives using a variety of geographical indicators, such as zip code and or latitudinal and longitudinal coordinates. Another API 118 used is the Census Geocoding API. The Census Geocoding API is an address lookup tool that determines approximate latitude/longitude coordinates based on an inputted address.

In some embodiments, if a user has logged into the MRSC application 114 using Facebook, Google, or other social networking platforms, the MRSC application 114 is configured to predictively determine the user's residence based on various locational information obtained through the corresponding social networking platform API. For example, if the user has been tagged more frequently in a particular city and/or has "checked in" at more establishments in a particular city than anywhere else, the MRSC application 114 is configured to infer that the user resides in that city and to provide the user with government representatives who represent that city.

In some instances, the search entry field 304 includes a "user location" button 328 configured to enter a location of the user based on the IP address of the user device 102. For example, in one embodiment, this is achieved through the integration of the ipstack free IP Geolocation API. Accordingly, the MRSC application 114 is configured to access multiple APIs 118 to provide the at least one government representative 1302 based on the geographical indicator and/or the name of the government representative. For example, in some instances, the latitudinal and longitudinal coordinates of the user device 102 are obtained using the ipstack free IP Geolocation API, the Census Geocoding API, or any other suitable API, and that information is then used with the Sunlight Congress API or any other suitable API to obtain the list of government representatives.

Once the at least one government representative 1302 has been identified, the user may select one or more government representatives 1302 to send a message to by clicking on a corresponding one or more selection boxes 1306 (or a select all box 1308) and subsequently clicking on one of the send message buttons 1310.

In some instances, the user may want to obtain information about one or more of the government representatives 1302. Accordingly, the user may click on the profile link 1304 of the government representative 1302 they would like to obtain information about. Upon clicking on one of the profile links 1304, the user is navigated to a government official conversation page 1400, as shown in FIGS. 14A and 14B.

Figure 14A:
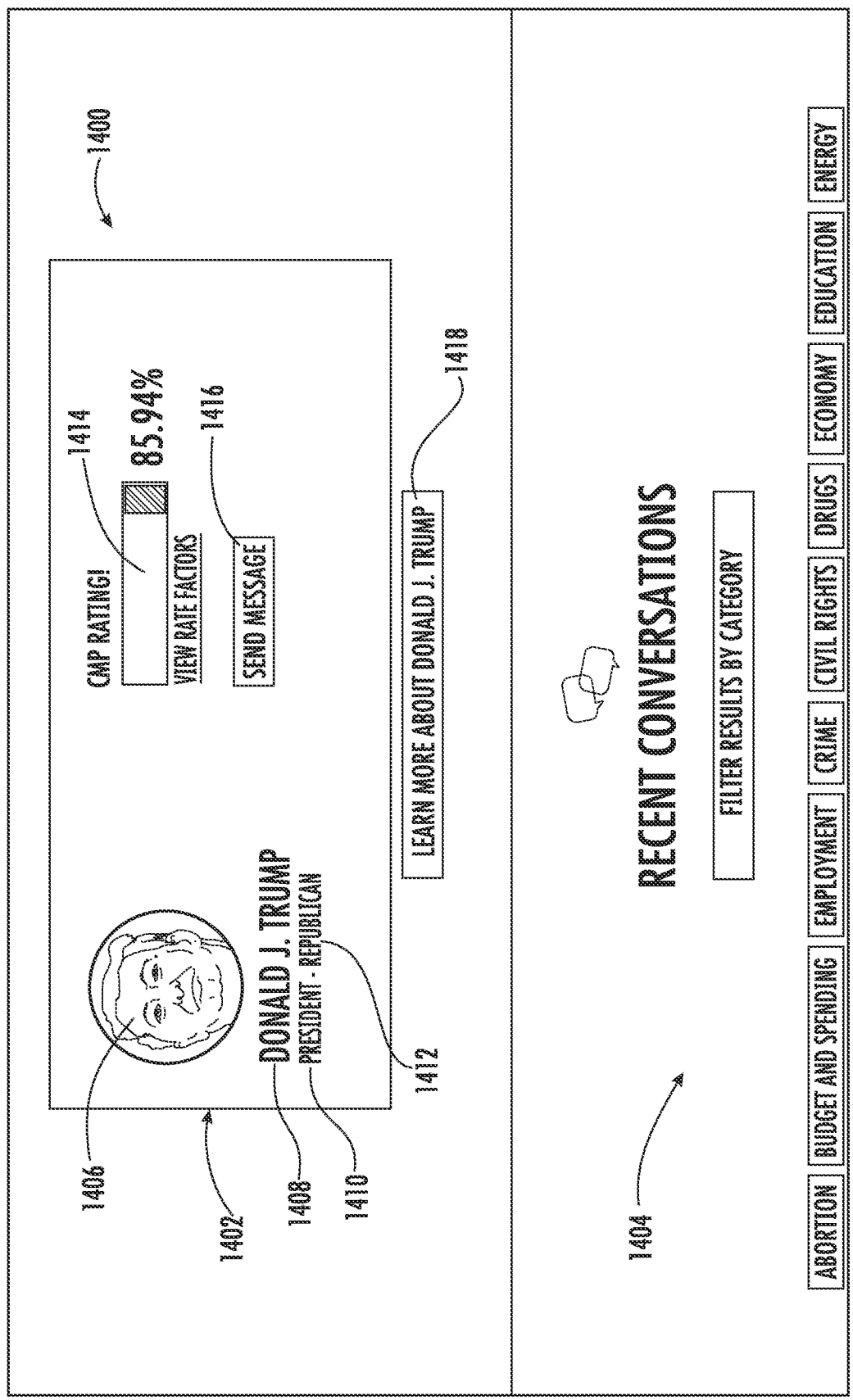
FIGS. 14A and 14B are examples of a government official conversation page provided by the system of FIG. 1 according to an exemplary embodiment.
Figure 14B:
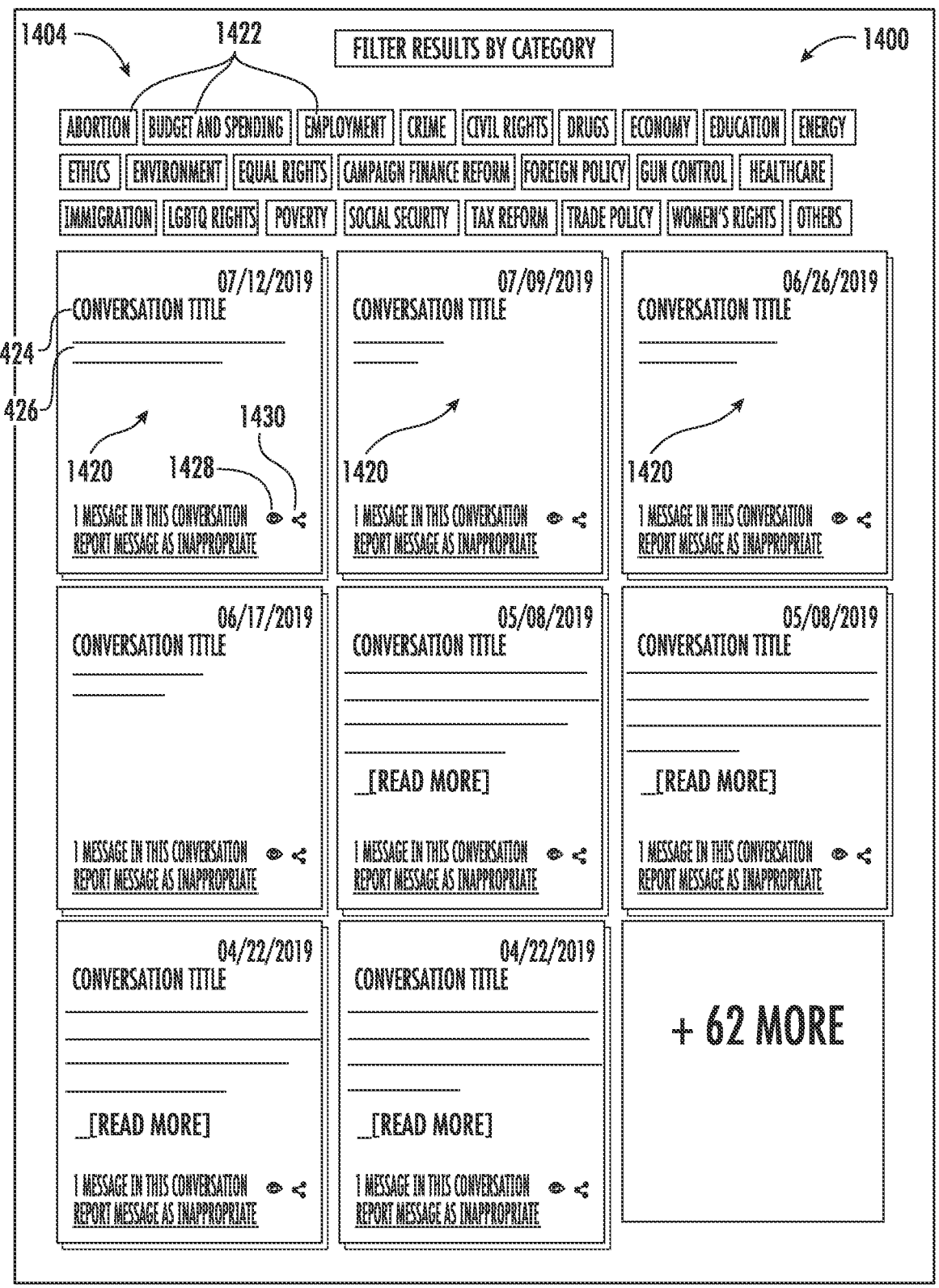

As illustrated in FIGS. 14A and 14B, the government official conversation page 1400 includes a politician information area 1402 (shown in FIG. 14A) and a recent conversations area 1404 (best shown in FIG. 14B). The politician information area 1402 includes a profile picture 1406, a politician name 1408, a governmental position 1410, a political party affiliation 1412, a response rating 1414, messaging links 1416, and an additional information link 1418. In one embodiment, the response rating 1414 is a percentage-based rating and is dependent on several variables. For example, the response rating 1414 in dependent on various response characteristics. The response characteristics include response receipt rate (e.g., do people receive responses from the politician), response time (e.g., how quickly people receive responses from the politician), and response quality (e.g., did the politician take the time and effort to address and understands the concern of the user). The response characteristics may be indicative of an activity level of the politician on the MRSC application 114, and indicative of how likely the politician is to read a message sent to them and how likely the politician is to respond to a message sent to them. As such, a user may use the response rating 1414 to determine whether to interact with a politician or whether interacting with a politician would be a waste of their time due to likelihood of the politician not reading a message from the user or responding to a message.

Figure 15:
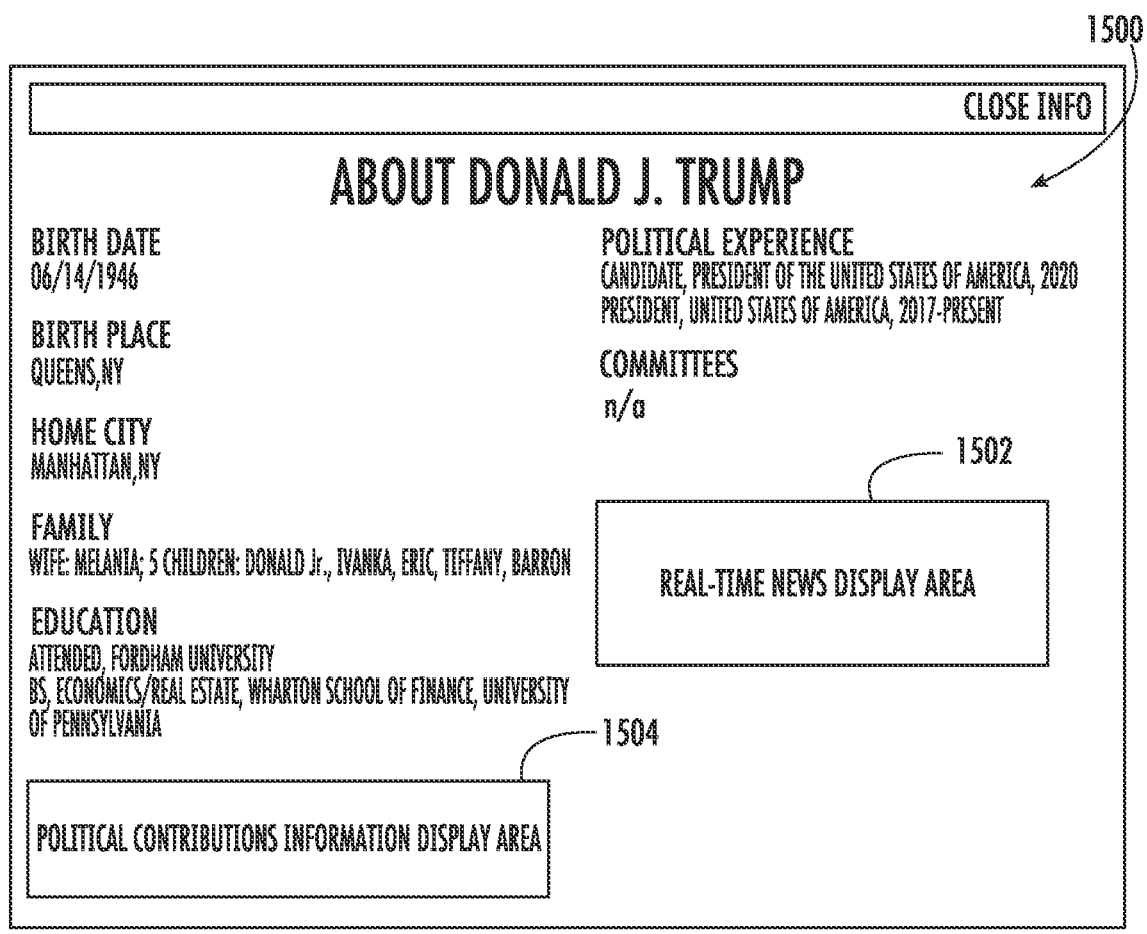
FIG. 15 is an example of a government official profile page provided by the system of FIG. 1 according to an exemplary embodiment.

If the user would like to learn more about the politician, the user may click on the additional information link 1418. Upon clicking the additional information link 1418, a popup government official profile window 1500 pops up over the government official conversation page 1400. The popup government official profile window 1500 is shown in FIG. 15. As illustrated, the popup government official profile window 1500 includes various additional information regarding the politician, such as, for example, birth date, birth place, home city, family, education, political experience, and committees the politician is on. It will be understood that this list is not meant to be limiting. This information is obtained by the MRSC application 114 using one or more suitable and APIs. Accordingly, the various information described above and/or additional information may be obtained and displayed to the user using a variety of APIs, such as, for example, Google Civic Information API, Ballot Ready API, Project Vote Smart API, Watchdog API, ProPublica Congress API, Open States API.

Additionally, the popup government official profile window 1500 includes a real-time news display area 1502 configured to display real-time news regarding the politician and/or the user's district as it pertains to the politician. In one embodiment, this real-time news is acquired through the use of one or more suitable APIs. A multitude of publicly-available news APIs are available online, such as, for example, Google Trends API, News API, New York Times Article Search API, Bing News Search API, SummarizeBot API, and various other APIs. It will be appreciated that any number of news APIs may be implemented with the MRSC application 114 for displaying real-time news regarding various politicians and/or the user's district, as desired.

Further, popup government official profile window 1500 includes a political contributions information display area 1504 configured to display information regarding who has supported the politician financially. This information regarding who has supported the politician financially is similarly acquired through the use of one or more suitable APIs. Again, a multitude of APIs pertaining to money in politics are publicly available online. For example, the Follow the Money API tracks contributions in all 50 states and proves this data as an easily searchable resource. Similarly, the OpenSecrets API performs research to track money in U.S. politics and its effect on elections and public policy. In some instances, the OpenSecrets API is used to access, among other things, a politician's top contributors and personal financial disclosures. Various other APIs may be used including, but not limited to, the Federal Election Commission API, the Center for Responsive Politics API, and MapLights API.

Referring again to FIG. 14B, the recent conversations area 1404 includes a list of recent public conversations 1420 and a plurality of category filter buttons 1422. Each conversation in the list of recent public conversations 1420 displays a conversation title 1424, a message preview 1426, a watch button 1428, and a share button 1430. The plurality of category filter buttons 1422 function similarly to the filter buttons 1006 described above.

Referring now to FIG. 16, upon clicking on a conversation title 1424, the MRSC application 114 is configured to allow the user to view the selected public conversation 1420, and the user is navigated to a conversation viewing page 1600. The conversation viewing page 1600 similarly includes a conversation title 1602, a message body 1604, a watch button 1606, a share button 1608, a first jump button 1610 configured to jump the user to the newest message in the conversation, a second jump button 1612 configured to jump the user to the first message in the conversation, and a return button 1614 configured to return the user to the government official conversation page 1400.

As illustrated, the message body 1604 may include text 1616 and/or photographs 1618. In some instances, the message body 1604 alternatively or additionally includes video and/or audio files. The watch button 1606 allows the user to add the selected conversation to the watching list (as described above with reference to FIG. 11). The share button 1608 allows the user to share the selected conversation using various communication methods. For example, the conversation may be shared over social media (e.g., Facebook, Instagram, Twitter, etc.), via email, via text messaging, or any suitable communication method.

Further, although not explicitly depicted, in some instances, a user may further choose to allow other users to interact with their conversations. For example, if a user's conversation with a government representative is a public conversation, the user may additionally select an open conversation, thereby allowing other users to add responses of their own to the conversation. As such, in some embodiments, the public conversation is an open forum-type conversation allowing for multiple users to interact and/or respond to the conversation. However, the user may alternatively select a closed public conversation, such that other users may view, watch, and/or share the conversation, but may not add responses of their own. Further, the user may alternatively select a private conversation, such that other users are not allowed to view, watch, share and/or otherwise interact with the conversation.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include one or more general purpose computers including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method comprising:
generating a first graphical user interface, the first graphical user interface including:
a search entry field;
selectable buttons configured to allow a user to choose between entering a geographical indicator of the user and a government representative name within the search entry field, the selectable buttons arranged above the search entry field on the first graphical user interface;
a navigation link configured to allow the user to create a registered account, the navigation link arranged below the search entry field on the first graphical user interface; and
one or more embedded informational videos arranged below the navigation link on the first graphical user interface;
displaying the first graphical user interface on a display of a user device associated with the user;
receiving the geographical indicator via the first graphical user interface;
upon receiving the geographical indicator, generating a second graphical user interface, the second graphical user interface including:
a list of government representatives associated with the geographical indicator, the list of government representatives allowing the user to select multiple government representatives for messaging simultaneously and being organized among at least two columns each including a vertically arranged subset of government representatives of government representatives, the at least two columns arranged horizontally adjacent to one another;
a plurality of links, each link of the plurality of links being associated with a corresponding government representative and configured to direct the user to a corresponding profile page of the corresponding government representative when selected; and
a pair of send message buttons each configured to send a message from the user to one or more government representatives selected from the list of government representatives, the pair of send message buttons including a first send message button arranged at a top of the list of government representatives and a second send message button arranged at a bottom of the list of government representatives;
displaying the second graphical user interface on the display of the user device;
receiving a selection of a link of the plurality of links via the second graphical user interface; and
displaying, based on the selection of the link, the corresponding profile page associated with the corresponding government representative.

2. The method of claim 1, further comprising:
displaying, based on receiving the selection of the link, a politician rating for the corresponding government representative on the corresponding profile page, the politician rating based on a response characteristic associated with a likelihood of receiving a response from the corresponding government representative.

3. The method of claim 1, further comprising:
displaying, based on receiving the selection of the link, a list of public conversations with the corresponding government representative on the corresponding profile page, wherein the list of public conversations are displayed in a tiled arrangement on the corresponding profile page, the tiled arrangement being organized among at least two columns each displaying at least one public conversation of the list of public conversations.

4. The method of claim 3, further comprising:
displaying a plurality of category filter buttons on the corresponding profile page, the plurality of category filter buttons configured to enable the user to filter the list of public conversations based on a plurality of topics of interest.

5. The method of claim 4, further comprising:
receiving, after displaying the list of public conversations on the user device, a selection of at least one category filter button associated with at least one topic of interest on the corresponding profile page by the user device; and
filtering the list of public conversations based on the received selection of the at least one category filter button by removing at least one public conversation from the list of public conversations displayed on the corresponding profile page.

6. The method of claim 5, wherein the at least one topic of interest is at least one of abortion, budget and spending, employment, crime, civil rights, drugs, economy, education, energy, ethics, environment, equal rights, campaign finance reform, foreign policy, gun control, healthcare, immigration, Lesbian Gay Bisexual Transgender Queer (LGBTQ) rights, poverty, social security, tax reform, trade policy, and women's rights.

7. The method of claim 1, wherein the selectable buttons are selectable radio buttons, and wherein the geographical indicator is at least one of a street address, a city, a county, a district, or a zip code.

8. The method of claim 1, wherein, for each government representative of the list of government representatives, the second graphical user interface includes a corresponding picture of the government representative, and the second graphical user interface further includes:
 a plurality of selection elements, each selection element of the plurality of selection elements encompassing an area adjacent to the corresponding picture of a corresponding government representative, the plurality of selection elements allowing for the multiple government representatives to be selected via the second graphical user interface simultaneously.

9. The method of claim 1, wherein the second graphical user interface further includes the geographical indicator arranged above the list of government representatives.

10. A system comprising:
 a processing circuit including a processor coupled to a non-transitory machine readable storage media having instructions stored therein that, when executed by the processor, cause the processor to perform operations, the operations comprising:
  generating a first graphical user interface, the first graphical user interface including:
   a search entry field;
   selectable buttons configured to allow a user to choose between entering a geographical indicator of the user and a government representative name within the search entry field, the selectable buttons arranged above the search entry field on the first graphical user interface;
   a navigation link configured to allow the user to create a registered account, the navigation link arranged below the search entry field on the first graphical user interface; and
   one or more embedded informational videos arranged below the navigation link on the first graphical user interface;
  displaying the first graphical user interface on a display of a user device associated with the user;
  receiving the geographical indicator via the first graphical user interface;
  upon receiving the geographical indicator, generating a second graphical user interface, the second graphical user interface including:
   a list of government representatives associated with the geographical indicator, the list of government representatives allowing the user to select multiple government representatives for messaging simultaneously and being organized among at least two columns each including a vertically arranged subset of government representatives of the list of government representatives, the at least two columns arranged horizontally adjacent to one another;
   a plurality of links, each link of the plurality of links being associated with a corresponding government representative and configured to direct the user to a corresponding profile page of the corresponding government representative when selected; and
   a pair of send message buttons each configured to send a message from the user to one or more government representatives selected from the list of government representatives, the pair of send message buttons including a first send message button arranged at a top of the list of government representatives and a second send message button arranged at a bottom of the list of government representatives;
  displaying the second graphical user interface on the display of the user device;
  receiving a selection of a link of the plurality of links via the second graphical user interface; and
  displaying, based on the selection of the link, the corresponding profile page associated with the corresponding government representative.

11. The system of claim 10, wherein the operations further comprise:
 displaying, based on receiving the selection of the link, a politician rating for the corresponding government representative on the corresponding profile page, the politician rating based on a response characteristic associated with a likelihood of receiving a response from the corresponding government representative.

12. The system of claim 10, wherein the operations further comprise:
 displaying, based on receiving the selection of the link, a list of public conversations with the corresponding government representative on the corresponding profile page, wherein the list of public conversations are displayed in a tiled arrangement on the corresponding profile page, the tiled arrangement being organized among at least two columns each displaying at least one public conversation of the list of public conversations.

13. The system of claim 12, wherein the operations further comprise:
 displaying a plurality of category filter buttons on the corresponding profile page, the plurality of category filter buttons configured to enable the user to filter the list of public conversations based on a plurality of topics of interest.

14. The system of claim 13, wherein the operations further comprise:
 receiving, after displaying the list of public conversations on the user device, a selection of at least one category filter button associated with at least one topic of interest on the corresponding profile page by the user device; and
 filtering the list of public conversations based on the received selection of the at least one category filter button by removing at least one public conversation from the list of public conversations displayed on the corresponding profile page.

15. The system of claim 14, wherein the at least one topic of interest is at least one of abortion, budget and spending, employment, crime, civil rights, drugs, economy, education, energy, ethics, environment, equal rights, campaign finance reform, foreign policy, gun control, healthcare, immigration, Lesbian Gay Bisexual Transgender Queer (LGBTQ) rights, poverty, social security, tax reform, trade policy, and women's rights.

16. The system of claim 10, wherein the selectable buttons are selectable radio buttons, and wherein the geographical indicator is at least one of a street address, a city, a county, a district, or a zip code.

17. The system of claim 10, wherein, for each government representative of the list of government representatives, the second graphical user interface includes a corresponding picture of the government representative, and wherein the second graphical user interface further includes:
the geographical indicator arranged above the list of government representatives; and
a plurality of selection elements, each selection element of the plurality of selection elements encompassing an area adjacent to the corresponding picture of a corresponding government representative, the plurality of selection elements allowing for the multiple government representatives to be selected via the second graphical user interface simultaneously.

18. A system comprising:
a processing circuit including a processor coupled to a non-transitory machine readable storage media having instructions stored therein that, when executed by the processor, cause the processor to perform operations, the operations comprising:
generating a first graphical user interface, the first graphical user interface including:
a search entry field;
selectable buttons configured to allow a user to choose between entering a geographical indicator of the user and a government representative name within the search entry field, the selectable buttons arranged above the search entry field on the first graphical user interface;
a navigation link configured to allow the user to create a registered account, the navigation link arranged below the search entry field on the first graphical user interface; and
one or more embedded informational videos arranged below the navigation link on the first graphical user interface;
displaying the first graphical user interface on a display of a user device associated with the user;
receiving the geographical indicator via the first graphical user interface;
upon receiving the geographical indicator, generating a second graphical user interface to be displayed on the user device, the second graphical user interface including:
a list of government representatives associated with the geographical indicator, the list of government representatives organized among at least two columns each including a vertically arranged subset of government representatives of the list of government representatives, the at least two columns arranged horizontally adjacent to one another;
a plurality of selection elements, each selection element of the plurality of selection elements encompassing an area adjacent to a corresponding government representative, the plurality of selection elements allowing for multiple government representatives to be selected via the second graphical user interface simultaneously; and
a pair of send message buttons each configured to send a message from the user to one or more government representatives of the list of government representatives selected using one or more selection elements of the plurality of selection elements, the pair of send message buttons including a first send message button arranged at a top of the list of government representatives and a second send message button arranged at a bottom of the list of government representatives;
receiving a selection of a plurality of government representatives by the user device via a corresponding plurality of selection elements of the second graphical user interface; and
sending a message from the user to the plurality of government representatives simultaneously.

19. The system of claim 18, wherein the second graphical user interface further includes a plurality of links, each link of the plurality of links being associated with a corresponding government representative and configured to direct the user to a corresponding profile page of the corresponding government representative when selected, and the operations further comprise:
displaying, based on receiving a selection of one of the links, a politician rating for the corresponding government representative on the corresponding profile page, the politician rating based on a response characteristic associated with a likelihood of receiving a response from the corresponding government representative.

20. The system of claim 18, wherein the second graphical user interface further includes a plurality of links, each link of the plurality of links being associated with a corresponding government representative and configured to direct the user to a corresponding profile page of the corresponding government representative when selected, and the operations further comprise:
displaying, based on receiving a selection of one of the links, a list of public conversations with the corresponding government representative on the corresponding profile page, wherein the list of public conversations are displayed in a tiled arrangement on the corresponding profile page, the tiled arrangement being organized among at least two columns each displaying at least one public conversation of the list of public conversations.

21. The system of claim 20, wherein the operations further comprise:
displaying a plurality of category filter buttons on the corresponding profile page, the plurality of category filter buttons configured to enable the user to filter the list of public conversations based on a plurality of topics of interest.

22. The system of claim 21, wherein the operations further comprise:
receiving, after displaying the list of public conversations on the user device, a selection of at least one category filter button associated with at least one topic of interest on the corresponding profile page by the user device; and
filtering the list of public conversations based on the received selection of the at least one category filter button by removing at least one public conversation from the list of public conversations displayed on the corresponding profile page.

23. The system of claim 22, wherein the at least one topic of interest is at least one of abortion, budget and spending, employment, crime, civil rights, drugs, economy, education, energy, ethics, environment, equal rights, campaign finance reform, foreign policy, gun control, healthcare, immigration, Lesbian Gay Bisexual Transgender Queer (LGBTQ) rights, poverty, social security, tax reform, trade policy, and women's rights.

24. The system of claim 18, wherein the selectable buttons are selectable radio buttons, and wherein the geographical indicator is one of a street address, a city, a county, a district, or a zip code.

25. The system of claim 18, wherein, for each government representative of the list of government representatives, the second graphical user interface includes a corresponding picture of the government representative, wherein the area adjacent to the corresponding government representative is an area adjacent to the corresponding picture of the corresponding government representative and wherein the second graphical user interface further includes the geographical indicator arranged above the list of government representatives.

26. A method comprising:
   generating a first graphical user interface, the first graphical user interface including:
      a search entry field;
      selectable buttons configured to allow a user to choose between entering a geographical indicator of the user and a government representative name within the search entry field, the selectable buttons arranged above the search entry field on the first graphical user interface;
      a navigation link configured to allow the user to create a registered account, the navigation link arranged below the search entry field on the first graphical user interface; and
      one or more embedded informational videos arranged below the navigation link on the first graphical user interface;
   displaying the first graphical user interface on a display of a user device associated with the user;
   receiving the geographical indicator via the first graphical user interface;
   upon receiving the geographical indicator, generating a second graphical user interface to be displayed on the user device, the second graphical user interface including:
      a list of government representatives associated with the geographical indicator of the user, the list of government representatives organized among at least two columns each including a vertically arranged subset of government representatives of the list of government representatives, the at least two columns arranged horizontally adjacent to one another;
      a plurality of selection elements, each selection element of the plurality of selection elements encompassing an area adjacent to a corresponding government representative, the plurality of selection elements allowing for multiple government representatives to be selected via the second graphical user interface simultaneously; and
      a pair of send message buttons each configured to send a message from the user to one or more government representatives of the list of government representatives selected using one or more selection elements of the plurality of selection elements, the pair of send message buttons including a first send message button arranged at a top of the list of government representatives and a second send message button arranged at a bottom of the list of government representatives;
   receiving a selection of a plurality of government representatives by the user device via a corresponding plurality of selection elements of the second graphical user interface; and
   sending a message from the user to the plurality of government representatives simultaneously.

27. The method of claim 26, wherein the second graphical user interface further includes a plurality of links, each link of the plurality of links being associated with a corresponding government representative and configured to direct the user to a corresponding profile page of the corresponding government representative when selected, and the method further comprises:
   displaying, based on receiving a selection of one of the links, a politician rating for the corresponding government representative on the corresponding profile page, the politician rating based on a response characteristic associated with a likelihood of receiving a response from the corresponding government representative.

28. The method of claim 26, wherein the second graphical user interface further includes a plurality of links, each link of the plurality of links being associated with a corresponding government representative and configured to direct the user to a corresponding profile page of the corresponding government representative when selected, and the method further comprises:
   displaying, based on receiving a selection of one of the links, a list of public conversations with the corresponding government representative on the corresponding profile page, wherein the list of public conversations are displayed in a tiled arrangement on the corresponding profile page, the tiled arrangement being organized among at least two columns each displaying at least one public conversation of the list of public conversations.

29. The method of claim 28, further comprising:
   displaying a plurality of category filter buttons on the corresponding profile page, the plurality of category filter buttons configured to enable the user to filter the list of public conversations based on a plurality of topics of interest.

30. The method of claim 29, further comprising:
   receiving, after displaying the list of public conversations on the user device, a selection of at least one category filter button associated with at least one topic of interest on the corresponding profile page by the user device; and
   filtering the list of public conversations based on the received selection of the at least one category filter button by removing at least one public conversation from the list of public conversations displayed on the corresponding profile page.

31. The method of claim 30, wherein the at least one topic of interest is at least one of abortion, budget and spending, employment, crime, civil rights, drugs, economy, education, energy, ethics, environment, equal rights, campaign finance reform, foreign policy, gun control, healthcare, immigration, Lesbian Gay Bisexual Transgender Queer (LGBTQ) rights, poverty, social security, tax reform, trade policy, and women's rights.

32. The method of claim 26, wherein the selectable buttons are selectable radio buttons, and wherein the geographical indicator is one of a street address, a city, a county, a district, or a zip code.

33. The method of claim 26, wherein, for each government representative of the list of government representatives, the second graphical user interface includes a corresponding picture of the government representative, and the area adjacent to the corresponding government representative is an area adjacent to the corresponding picture of the corresponding government representative.

34. The method of claim 26, wherein the second graphical user interface further includes the geographical indicator arranged above the list of government representatives.

\* \* \* \* \*